(12) United States Patent
Hyakutake et al.

(10) Patent No.: US 8,028,511 B2
(45) Date of Patent: Oct. 4, 2011

(54) INTEGRATED GASIFICATION COMBINED CYCLE POWER GENERATION PLANT

(75) Inventors: Yoshinori Hyakutake, Hyogo-ken (JP); Yoshiaki Tsukuda, Tokyo (JP); Takao Hashimoto, Tokyo (JP); Satoshi Uchida, Nagasaki-ken (JP); Katsuhiro Ota, Tokyo (JP); Takashi Sonoda, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 910 days.

(21) Appl. No.: 12/007,244

(22) Filed: Jan. 8, 2008

(65) Prior Publication Data

US 2008/0295480 A1    Dec. 4, 2008

Related U.S. Application Data

(60) Provisional application No. 60/924,756, filed on May 30, 2007.

(51) Int. Cl.
*F02B 43/00* (2006.01)
*F02G 3/00* (2006.01)

(52) U.S. Cl. ............... 60/39.12; 60/780; 60/781; 60/726

(58) Field of Classification Search ............... 60/781, 60/780, 39.12, 39.464, 726
See application file for complete search history.

(56) References Cited

U.S. PATENT DOCUMENTS

| 5,688,296 A | 11/1997 | Andrus, Jr. et al. |
| 6,260,346 B1* | 7/2001 | Jansson et al. .................. 60/780 |
| 7,797,921 B2* | 9/2010 | Sonoda et al. ............... 60/39.12 |
| 2007/0151256 A1* | 7/2007 | Kamohara et al. .............. 60/781 |

FOREIGN PATENT DOCUMENTS

| JP | 61-205340 A | 9/1986 |
| JP | 62241990 A | 10/1987 |
| JP | 63-88225 A | 4/1988 |
| JP | 8-500412 A | 1/1996 |
| JP | 8121194 A | 5/1996 |

(Continued)

OTHER PUBLICATIONS

Russian Office Action dated Feb. 15, 2011, issued in correspoinding Russian Patent Application No. 2009143256.

(Continued)

*Primary Examiner* — Ehud Gartenberg
*Assistant Examiner* — Craig Kim
(74) *Attorney, Agent, or Firm* — Westerman, Hattori, Daniels & Adrian, LLP

(57) ABSTRACT

A gasifying agent supply path A from an axial flow compressor 21 which boosts pressure of a gasifying agent to a gasifying furnace 2 is branched, and a gasifying agent bypass path D having an escaping pressure adjusting valve 23 is provided. The flow quantity or pressure of the gasifying agent supplied to the gasifying furnace 2 from the gasifying agent supply path A can be adjusted according to the degree of opening of the adjusting valve 23 disposed in the gasifying agent bypass path D, whereby providing a control valve in the gasifying agent supply path A is no longer necessary. Thus, pressure loss at the gasifying agent supply path A can be suppressed, and the discharge pressure of the axial flow compressor 21 can be greatly reduced.

15 Claims, 22 Drawing Sheets

FOREIGN PATENT DOCUMENTS

| | | |
|---|---|---|
| JP | 9-221686 A | 8/1997 |
| JP | 10251669 A | 9/1998 |
| JP | 10-325337 A | 12/1998 |
| JP | 2000-345856 A | 12/2000 |
| JP | 2003-293794 A | 10/2003 |
| JP | 2006118391 A | 5/2006 |

OTHER PUBLICATIONS

International Search Report of PCT/JP2008/059727, mailing date Aug. 26, 2009.

Japanese Office Action dated Jun. 21, 2011, issued in corresponding Japanese Patent Application No. 2009-517812.

* cited by examiner

INTEGRATED GASIFICATION COMBINED CYCLE POWER GENERATION PLANT

CROSS-REFERENCE TO RELATED APPLICATIONS

This application claims the benefit of U.S. Provisional Application No. 60/924,756, filed May 30, 2007.

BACKGROUND OF THE INVENTION

1. Field of the Invention

The present invention relates to an integrated gasification combined cycle power generation plant (hereafter, "IGCC") which drives a gas turbine with flammable gas obtained by gasifying a solid fuel such as coal, and the operation control apparatus and method thereof.

2. Description of Related Art

As a power generation plant using gas turbines, an IGCC (Integrated Gasification Combined Cycle) which employs fossil fuels such as coal for fuel gas is known. With an IGCC, solid fuel is gasified by causing a high temperature gas agent to come in contact with a solid fuel in powder form in a gasifying furnace, thereby generating flammable gas. This flammable gas is then supplied to a combustor of a gas turbine, whereby the gas turbine is rotationally driven, and the rotational force thereof is transmitted mechanically to a power generator, whereby power generating is performed by power generator.

The schematics of a conventional IGCC will be described with reference to FIG. 29. FIG. 29 is a diagram illustrating a schematic configuration of the IGCC having an entrained method of gas furnace. With the IGCC in FIG. 29, coal in powder form, along with air, is supplied to a gasifying furnace 102 from a coal supplying facility 101. Char forming from carbon which is segregated from the generated flammable gas is also supplied to the gasifying furnace 102.

In the entrained method gasifying furnace 102, oxygen or air is supplied as a gasifying agent, pulverized coal and char similarly supplied are burned in a high temperature atmosphere of roughly 1500 to 1800 degrees Celsius which is greater than the ash melting point, whereby coal gas which is a flammable gas is generated. Further, upon the generated flammable gas being cooled by a heat converter configured within the gasifying furnace 102, and discharged outside of a dust removal facility 103, whereby the char remaining in the flammable gas is segregated and collected by the dust removal facility 103.

The flammable gas following the char having been segregated and subjected to dust removal is supplied to a gas clean up facility 104, whereby a sulfuric compound such as $H_2S$ (hydrogen sulfide) or COS (carbonyl sulfide), a nitrogen compound such as NH2 (ammonia), fine particles such as char, and trace components such as HCl (hydrogen chloride) and HCN (hydrogen cyanide) are removed with the flammable gas.

The flammable gas with the various components removed with the gas clean up facility 104 is supplied to a combustor 106 through a fuel supply path 105. With the combustor 106, a flammable gas is combusted with compressed air supplied from a compressor 107, whereby combustion gas is generated. The combustion gas is supplied to a gas turbine 108 from the combustor 106, and the gas turbine 108 is rotationally driven, whereby a power generator 109 having the same axis as the gas turbine 108 performs power generation.

The combustion gas having completed the process in the gas turbine 108 is exhausted to a heat recovery steam generator (HRSG) 111 as exhaust gas. Heat recovery is performed at the HRSG 111 by heat exchange with steam and the exhaust gas from the gas turbine 108. The steam subjected to heating by the heat of the exhaust gas from the gas turbine 108 is supplied to a steam turbine 112 by the HRSG 111, whereby the steam turbine 112 is rotationally driven, and a power generator 110 having the same axis as the steam turbine 112 performs power generation. The steam having rotationally driven the steam turbine 112 is condensed with the condensation device 113, and after this is supplied to the HRSG 111. Further, the exhaust gas subjected to heat recovery with the HRSG 111 is exhausted to the ambient atmosphere with the smokestack 114. The gas turbine and steam turbine described here have separate axes, but may be arranged so as to have the same axis.

A portion of the compressed air which is compressed with the compressor 107 is extracted and compressed with an axial flow compressor 115. The compressed air compressed with the axial flow compressor 115 is guided to the gasifying furnace 102. In the process wherein the compressed air is supplied to the gasifying furnace 102, oxygen which is segregated with an air separating facility 116 is mixed therein, and air with a large amount of oxygen components is supplied as a gasifying agent to the gasifying furnace 102.

On the other hand, the nitrogen which is segregated with the air separating facility 116 is supplied to the coal supplying facility 101, and is employed as a pressurizing medium or transporting medium in the event of supplying the pulverized coal and char to the gasifying furnace 102. The compressor 115 may extract a portion from the compressed air which is compressed with the compressor 107, or may obtain air from the atmosphere. The compressor 115 may be an axial flow compressor or a centrifugal compressor.

A control valve 118 to control flow quantity and pressure of the air supplied to the gasifying furnace 102 is provided in the gasifying agent supply path 117 which supplies the compressed air from the axis flow compressor 115 to the gasifying furnace 102. A control valve 120 to control the flow quantity and pressure of oxygen which is mixed into the air supplied to the gasifying furnace 102 is provided in the oxygen supply path 119 to supply oxygen from the air separating facility 116 to the gasifying furnace 102. Further, a control valve 121 to control the flow amount of flammable gas to be supplied to the combustor 106 is provided in the fuel supply path 105.

Thus, by provided the control valves 118, 120, and 121, the flow quantity of flammable gas supplied to the combustor 106 can be controlled according to load fluctuation in the gas turbine 108. That is to say, the supply quantity of pulverized coal supplied to the gasifying furnace 102 is set according to the flammable gas flow quantity supplied to the combustor 106 which is set according to the degree of opening of the control valve 121. By setting the degree of opening of the control valves 118 and 120, the flow quantity and pressure of the gasifying agent (air) necessary for gasifying the pulverized coal supplied to the gasifying furnace 102 and the oxygen mix quantity can be set. In the case that the gasifying agent is only air without increasing the oxygen mix quantity in the gasifying agent, the air separating facility 116, oxygen supplying path 119, control valve 120, and so forth, are omitted.

As described above, with a conventional IGCC, as shown in FIG. 29, a control valve 118 is disposed in the gasifying supply path 117 to supply the gasifying agent to the gasifying furnace 102, and by the control valve 118 operating as a flow-quantity adjusting valve and pressure adjusting valve, the flow quantity and pressure of the gasifying agent supplied to the gasifying furnace 102 are adjusted. Therefore, a problem can arise wherein a pressure drop with the control valve 118 can occur, resulting in plant efficiency decrease. Further, it becomes necessary to perform pressure buildup with the axial flow compressor 115, taking into account the pressure drop with the control valve 118. Therefore, setting the discharge pressure of the axial flow compressor 115 to a high pressure, as well as arranging the various supply systems to the gasifying furnace 2 as configurations to withstand high pressure, becomes necessary. Accordingly, not only does the facility design of the IGCC become difficult, but the operation thereof also has increased restrictions for provisions regarding high pressure.

The present invention has been made with the above-mentioned problems in mind, and provides an integrated gasification combined cycle power generation plant and the operation control apparatus and method thereof, wherein the pressure and flow quantity of gasifying agent to be supplied to the gasifying furnace can be controlled, and the pressure of the supply systems of the gasifying agent can have a lower pressure, and further, plant efficiency can be improved.

BRIEF SUMMARY OF THE INVENTION

In order to achieve the above-mentioned objects, the present invention has the following configuration.

A first aspect of the present invention is an integrated gasification combined cycle power generation plant comprising: a gasifying unit to generate a flammable gas by causing a gasifying agent which is a gas and solid fuel to react; a compressor to output compressed air which compresses ambient atmosphere; a combustor to combust the flammable gas generated in the gasifying unit with compressed air from the compressor; a gas turbine to rotationally drive supplied by combusted gas with the combustion operation of the combustor; a booster to boost the gasifying agent supplied to the gasifying unit; a gasifying agent supply path to supply the gasifying agent boosted by the booster to the gasifying unit; a gasifying agent bypass path which is branched from the gasifying agent supply path; and a first control valve to adjust flow quantity or pressure of the gasifying agent flowing through the gasifying agent bypass path, by adjusting the degree of opening thereof.

According to the integrated gasification combined cycle power generation plant of the present invention, by providing a gasifying agent bypass path having a first control valve, the flow quantity or pressure of the gasifying agent escaping from the gasifying agent supply path can be adjusted. Accordingly, the flow quantity or pressure of the gasifying agent supplied to the gasifying unit with the gasifying agent supply path can be adjusted with the degree of opening of the first control valve provided in the gasifying agent bypass path. Therefore, since there is no need to dispose a control valve in the gasifying agent supplying path, and pressure loss in the gasifying supply path can be suppressed, enabling the exhaust pressure of the booster to be greatly reduced.

A second aspect of the present invention is an operating control apparatus applicable to an integrated gasification combined cycle power generation plant which includes a gasifying furnace to generate a flammable gas by causing a gasifying agent which is a gas and solid fuel to react; a combustor to combust the flammable gas generated in the gasifying furnace with compressed air from a compressor; a gas turbine to rotationally drive supplied by combusted gas with the combustion operation of the combustor; a booster to boost the gasifying agent supplied to the gasifying furnace; a gasifying agent supply path to supply the gasifying agent boosted by the booster to the gasifying furnace; a gasifying agent bypass path which is branched from the gasifying agent supply path; a first control valve provided on the gasifying agent bypass path; and a second control valve to control the flow quantity of gas supplied to the booster; wherein the operation control apparatus includes a first setting unit to set the gasifying agent requested amount to the gasifying furnace, based on the gas turbine requested output; a first control unit to control the degree of opening of the first control valve so that the gasifying agent quantity supplied to the gasifying furnace is equal to the gasifying agent request quantity set by the first setting unit; a second setting unit to set the degree-of-opening command of the second control valve so that the gasifying agent of a greater quantity than the gasifying agent request quantity is supplied to the gasifying bypass path; and a second control unit to control the second control valve based on the degree-of-opening command set by the second setting unit.

According to such a configuration, the gasifying agent in a quantity somewhat greater than the gasifying agent requested amount which is determined based on the requested output of the gas turbine is input into the gasifying agent supply path by the booster. From the gasifying agent in sufficient quantity, an excess portion is escaped to the gasifying agent bypass path via the first control valve, whereby an appropriate quantity of gasifying agent is supplied to the gasifying furnace. Thus, the desired power generating output can be obtained while reducing pressure loss.

In a case wherein the integrated gasification combined cycle power generation plant has a flammable gas supply path to supply the flammable gas generated in the gasifying furnace to the combustor, and a third control valve provided on the flammable gas supply path, the operation control apparatus may comprise: a third setting unit to set the flow quantity of the flammable gas supplied to the combustor, based on the requested output of the gas turbine and the ambient environment of the gas turbine; and a third control unit to control the degree of opening of the third control valve so that the flow quantity of the flammable gas supplied to the combustor is equal to the flow quantity set by the third setting unit which is set by the third setting unit.

With such a configuration, in the case that the third control valve for adjusting the flow quantity of the flammable gas to be supplied to the combustor is provided in the flammable gas supply path, the flammable gas quantity to be supplied to the combustor can be readily adjusted by controlling the third control valve based on the requested output of the gas turbine and the ambient environment of the gas turbine.

According to the operation control apparatus of the present invention, an arrangement may be made so that the first setting unit obtains the flammable gas request quantity to supply to the combustor based on the requested output of the gas turbine and the ambient environment of the gas turbine, and sets the gasifying agent request quantity to the gasifying furnace based on such flammable gas request quantity.

The flammable gas request quantity to be supplied to the combustor is obtained based on the requested output of the gas turbine and the ambient environment of the gas turbine, and the gasifying request quantity to the gasifying furnace is set based on this flammable gas request quantity, enabling the flammable gas output from the gasifying furnace to be adjusted according to the flammable gas request quantity supplied to the combustor. Therefore, a flow-quantity adjusting valve or the like to be provided at the front stage of the combustor to adjust the flow quantity of the flammable gas to be supplied to the combustor becomes unnecessary.

With the above-mentioned operation control apparatus, a first correcting unit may be further provided to correct the degree-of-opening command of the second control valve in the direction to increase the volume of air supplied to the booster, based on the boosting properties.

As the boosting properties of the booster declines due to aged deterioration or the like, the flow quantity of gasifying agent input into the gasifying agent supply path from the booster decreases. Accordingly, the degree-of-opening command of the second control value is corrected in the direction to increase the volume of air supplied to the booster with the boosting properties in mind, whereby an insufficient supply of gasifying agent can be avoided, and a sufficient quantity of gasifying agent can be constantly supplied to the gasifying agent supply path.

The above-mentioned operating control apparatus may further include an evaluating unit to evaluate the stability of load; wherein an arrangement may be made so that, in the case that determination is made by the evaluating unit that the load is stable, the first correcting unit is operated.

According to such a configuration the operation period of the first correcting unit can be limited to the time of load stability, whereby operation risk can be lowered.

In a case wherein the integrated gasification combined cycle power generation plant has a solid fuel supply path to supply the solid fuel to the gasifying furnace, and a fourth control valve provided in the solid fuel supply path, the operating control apparatus comprises a fourth setting unit to set a solid fuel request quantity to the gasifying furnace, based on the requested output of the gas turbine; and a fourth control unit to control the degree of opening of the fourth control valve, so that the solid fuel supplied to the gas furnace is equal to the solid fuel requested amount set by the fourth setting unit.

With such a configuration, the fourth control valve to adjust the solid fuel supply quantity to the gasifying furnace is provided in the solid fuel supply path to supply solid fuel to the gasifying furnace, and the fourth control valve is controlled based on the degree of opening determined based on the requested output of the gas turbine. Thus, the solid fuel supply quantity to the gasifying furnace can be adjusted to the desired value.

The operating control apparatus may further comprise a second correcting unit to correct the solid fuel request quantity based on the coal properties of the solid fuel supplied to the gasifying furnace.

With such a configuration, the solid fuel request quantity to be supplied to the gasifying furnace is corrected according to the coal properties of the solid fuel, whereby even in a case that the coal properties of the solid fuel vary due to coal-type switching and so forth, the calories of the flammable gas output from the gasifying furnace can be stabilized. Thus, desired gas turbine output can be obtained.

With the above-mentioned operating control apparatus, the second correcting unit corrects the solid fuel requested amount based on the calories of the solid fuel and power generating load.

According to such a configuration, not only the calories of the solid fuel, but also the solid fuel request quantity according to power generating load are corrected, enabling finer controls.

The operating control apparatus may further comprise an evaluating unit to evaluate the stability of load; wherein, in the case that determination is made by the evaluating unit that the load is stable, the second correcting unit is operated.

By limiting the operation time of the second correcting unit to the time of load stability, the operation risk can be reduced.

A third aspect of the present invention is an operating control method applicable to an integrated gasification combined cycle power generation plant; which includes a gasifying furnace to generate a flammable gas by causing a gasifying agent which is a gas and solid fuel to react; a combustor to combust the flammable gas generated in the gasifying furnace with compressed air from a compressor; a gas turbine to rotationally drive supplied by combusted gas with the combustion operation of the combustor; a booster to boost the gasifying agent supplied to the gasifying furnace; a gasifying agent supply path to supply the gasifying agent boosted by the booster to the gasifying furnace; a gasifying agent bypass path which is branched from the gasifying agent supply path; a first control valve provided on the gasifying agent bypass path; and a second control valve to control the flow quantity of gas supplied to the booster; and the operation control method for an integrated gasification combined cycle power generation plant includes a step of setting the gasifying agent requested amount to the gasifying furnace, based on the gas turbine requested output; a step of controlling the degree of opening of the first control valve so that the gasifying agent quantity supplied to the gasifying furnace is equal to the gasifying agent request quantity; a step of setting the degree-of-opening command of the second control valve so that the gasifying agent of a greater quantity than the gasifying agent request quantity is supplied to the gasifying bypass path; and a step of controlling the second control valve based on the degree-of-opening command.

The present invention has advantages in that the pressure and flow quantity of the gasifying agent to be supplied to the gasifying furnace can be controlled, and also the pressure of the supply systems for the gasifying agent can be reduced, facilitating further plant efficiency.

DETAILED DESCRIPTION OF THE INVENTION

Hereafter, the embodiments of integrated gasification combined cycle power generation plant (IGCC) relating to the present invention and the control apparatus and method thereof will be described with reference to the diagrams.

Examples of solid fuel to be applied to the integrated gasification combined cycle power generation plant according to the present invention may include heavy fuels such as coal, petroleum coke, coal coke, asphalt, pitch, oil shale and so forth, as well as discarded items such as old tires, plastics, or the like. With the various embodiments described below, the case of employing coal as the solid fuel will be described.

First Embodiment

Figure 1:
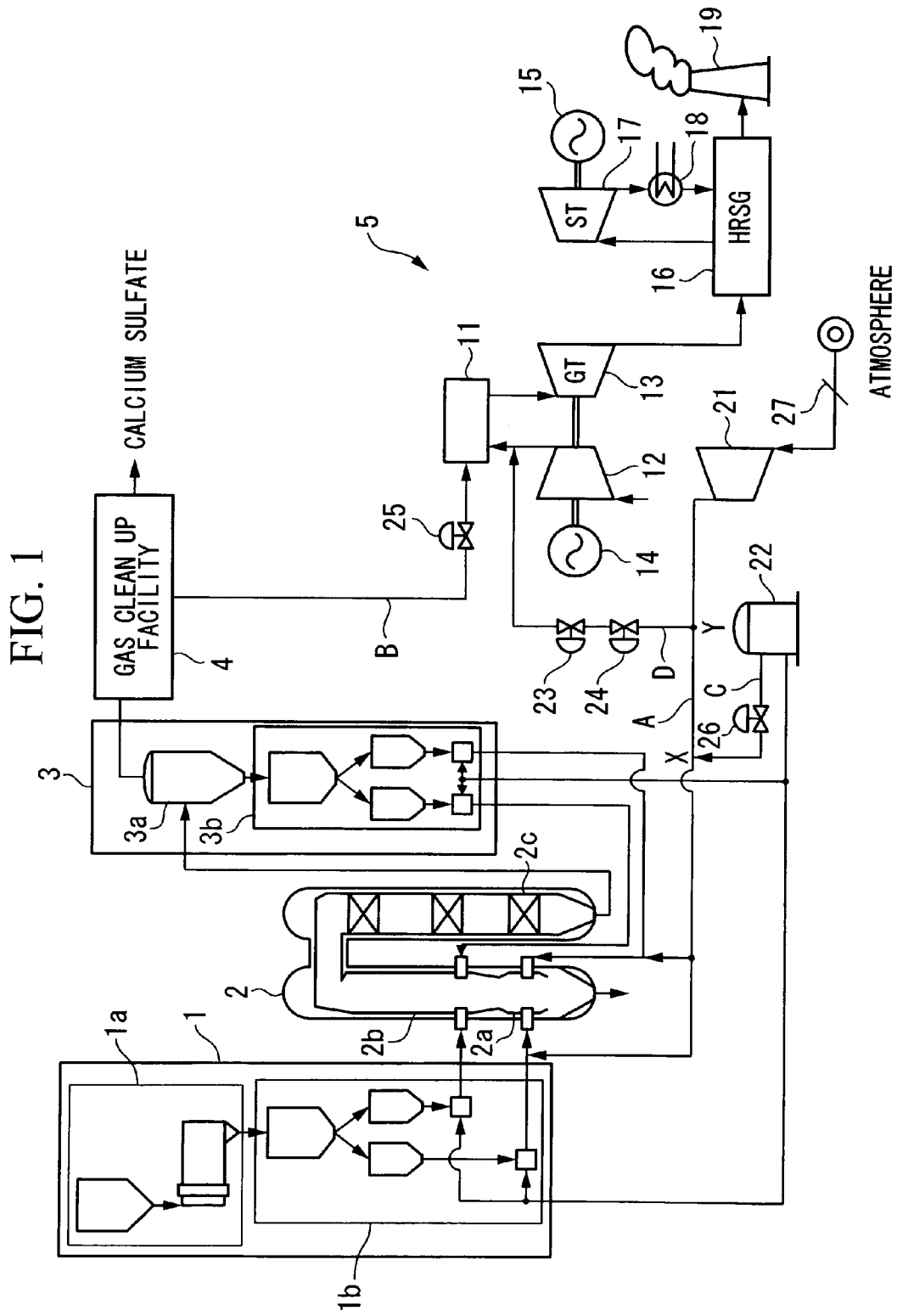
FIG. 1 is a diagram illustrating an overall schematic configuration of an IGCC relating to a first embodiment according to the present invention.

A first embodiment of the present invention will be described with reference to the diagrams. FIG. 1 is a block diagram illustrating a schematic configuration of an IGCC according to the present invention. The IGCC according to the present embodiment employs an air-blowing method to supply air as the gasifying agent.

As shown in FIG. 1, the IGCC relating to the present embodiment primarily comprises a coal supply facility 1, a gasifying furnace 2, a dust removal facility 3, a gas clean up facility 4, and a power generating facility 5.

(Coal Supply Facility 1)

The coal supply facility 1 comprises a pulverizer 1a which pulverizes coal accumulated in a raw coal bunker with a mill into pulverized coal of several μm to several hundred μm, and a pulverized coal supply device 1b which supplies the pulverized coal pulverized with the pulverizer 1a to the gasifying furnace 2. With the coal supply facility 1 thus configured, the pulverized coal obtained by pulverizing coal with the pulverizer 1a is supplied to the pulverized coal supply device 1b. A transporting fluid such as the nitrogen obtained by segregation at the air separating facility 16 is provided to the pulverized coal supply device 1b. Accordingly, the pulverized coal supply device 1b transports by airflow the pulverized coal provided from the pulverizing facility 1a and temporarily accumulated according to the flow quantity of the supplied transporting fluid, and supplies this to the gasifying furnace 2.

(Gasifying Furnace)

With the gasifying furnace 2, in a combustor 2a having a high temperature atmosphere of roughly 1500 to 1800° C. above the ash melting point, the pulverized coal supplied from the coal supply facility 1 and the char collected with the dust removal facility and supplied thereto react with the gasifying agent from the axial flow compressor 21. Thus, with the combustor 2a, the pulverized coal is burned at a high temperature, whereby coal gas which is a flammable gas, and a liquid slag wherein the ash in the pulverized coal is melted, are generated.

The high temperature coal gas obtained with the high temperature combustion in the combustor 2a flows into a redactor 2b provided on the upper stage of the combustor 2a. With the redactor 2b also, the pulverized coal from the coal supply facility 1 and the char from the dust removal facility 3 are supplied, and the supplied pulverized coal and char are further gasified, and flammable gas from coal gas is generated, whereby the flammable gas is cooled by flowing into the heat exchanger 2c. With the present embodiment, an entrained flow method wherein the liquid slag with melted coal ash is exhausted is employed, but a fixed-bed method or a fluidized-bed method may be employed instead of the entrained flow method. The flammable gas generated with the gasifying furnace 2 is transported to the dust removal facility 3.

(Dust Removal Facility)

The dust removal facility 3 has cyclone 3a to segregate and collect the char by swirling the flammable gas from the gasifying furnace 2 and a char supply device 3b to supply the char collected with the cyclone 3a to the gasifying furnace 2. With the dust removal facility 3, upon being supplied to the char supply device 3b, the char segregated in the cyclone 3a is temporarily stored in the char supply device 3b. Similar to the pulverized coal supply device 1b, the char supply device 3b transports the temporarily stored char by airflow according to the flow quantity of the transporting fluid such as nitrogen which is segregated at the air separating facility 16, and supplies this to the gasifying furnace 2. The flammable gas with the char removed in the cyclone 3a is supplied to the gas clean up facility 4. After being subjected to dust removal at the cyclone 3a, the flammable gas supplied in the gas clean up facility 4 may be filtered further.

(Gas Clean Up Facility)

When the flammable gas from the dust removal facility 3 is supplied, the gas clean up facility 4 first converts the COS included in the flammable gas from the dust removal facility 3 into $H_2$ and $CO_2$, thereby generating flammable gas containing $H_2S$. The flammable gas containing $H_2S$ is subjected to gas-liquid contact with a cleaning solution, thereby removing impurities such as HCl or $NH_3$, then is subjected to gas-liquid contact with an absorbing solution to be reused, whereby $H_2S$ is absorbed into the absorbing solution. Thus, the flammable gas having been subjected to removal of impurities such as HCl or $NH_3$, or $H_2S$, is supplied to a power generating facility 5 through a flammable gas supply path B.

(Power Generating Facility)

The power generating facility 5 comprises a combustor 11, compressor 12, gas turbine 13, power generators 14 and 15, HRSG 16, steam turbine 17, condensation device 18, and smokestack 19. Thus, with the IGCC relating to the present embodiment, an integrated power generation facility is comprised with a gas turbine 13 and steam turbine 17. With the present embodiment, the gas turbine 13 and steam turbine 17 are biaxially disposed, and also there are two power generators, 14 and 15, but an arrangement may be made wherein the gas turbine 13 and steam turbine 17 are disposed on one axis on the same axis, and there is one power generator.

With the power generating facility 5 thus configured, the compressed air from the compressor 12, as well as the flammable gas from the gas clean up facility 4, is supplied to the combustor 11. The flammable gas is combusted in the combustor 11, and the combustion gas is supplied to the gas turbine 13. The gas turbine 13 is rotationally driven with the combustion gas, the rotational driving is transmitted with a rotational shaft to the compressor 12 and power generator 14, the compressor 12 performs compression operation, and the power generator 14 performs power generation.

A portion of the compressed air exhausted from the compressor 12 is supplied to the combustor 11 and gas turbine 13 as a cooling medium in order to cool the portions subjected to high-temperature combustion gas such as the inner cylinder and tail cylinder of the combustor 11 and the blades and casing of the gas turbine 13.

The combustion gas rotating the gas turbine 13 is exhausted as exhaust gas, and is supplied to the HRSG 16. With the HRSG 16, the exhaust heat of the exhaust gas from the gas turbine 13 is used, and the water supplied from the condensation device 18 is heated to generate steam. The steam generated with the HRSG 16 is supplied to the steam turbine 17, whereby the steam turbine 17 is rotated. The rotational driving of the steam turbine 17 is transmitted with the rotation shaft to the power generator 15, and the power generator 15 performs power generation. The steam having rotated the steam turbine 17 is exhausted into the condensation device 18, whereby the pressure thereof is reduced and the steam is condensed. The exhaust gas from the gas turbine 13 which is cooled by using the exhaust heat at the HRSG 16 is exhausted from the smokestack 19 to the ambient atmosphere.

Next, description will be made regarding the configuration portions which are features of the IGCC according to the present embodiment. In other word, the details of the gasifying agent supply path A to transport the gasifying agent (mixed air, in the case of the present embodiment) to the gasifying furnace 2, and the flammable gas supply path B to transport the flammable gas (fuel) refined with the gas clean up facility 4 to the combustor will be described below.

With the present embodiment, as shown in FIG. 1, air in the atmosphere is transported as a gasifying agent to an axial flow compressor (booster) 21, and upon being boosted by the axial flow compressor 21, the transported air is inserted into the gasifying agent supply path A. The air quantity at this time is controlled by adjustments to the degree of opening of an IGV valve (Inlet Guide Vane: second control valve) 27.

The gasifying agent supply path A has a branching point Y where an oxygen supply path C through which oxygen segregated with the air separating facility 22 is transported converges, and also branches into a gasifying bypass path D further on the upstream side than the convergence point X with the oxygen supply path C. The gasifying agent bypass path D which branches from the gasifying supply path A has an escaping pressure adjusting valve (first control valve) 23 and blocking valve 24 provided therein.

The axial flow compressor 21 is rotationally driven by a separate shaft, differing from that of the gas turbine 13 or steam turbine 17. An arrangement may be made wherein the shaft thereof is the same as that of the gas turbine 13 and steam turbine 17. An arrangement may be made wherein the escaping pressure adjusting valve 23 has the function of the blocking valve, whereby the blocking valve 24 can be omitted.

A flow-quantity adjusting valve 25 (third control valve) 25 for adjusting the flow quantity of the flammable bas to be supplied to the combustor 11 is provided in the flammable gas supply path B which supplies the flammable gas from the gas clean up facility 4 to the combustor 11. The flammable gas supply path B has a blocking valve (unshown) for determining whether or not the flow quantity of flammable gas supplied to the combustor 11 can be adjusted.

Figure 29:
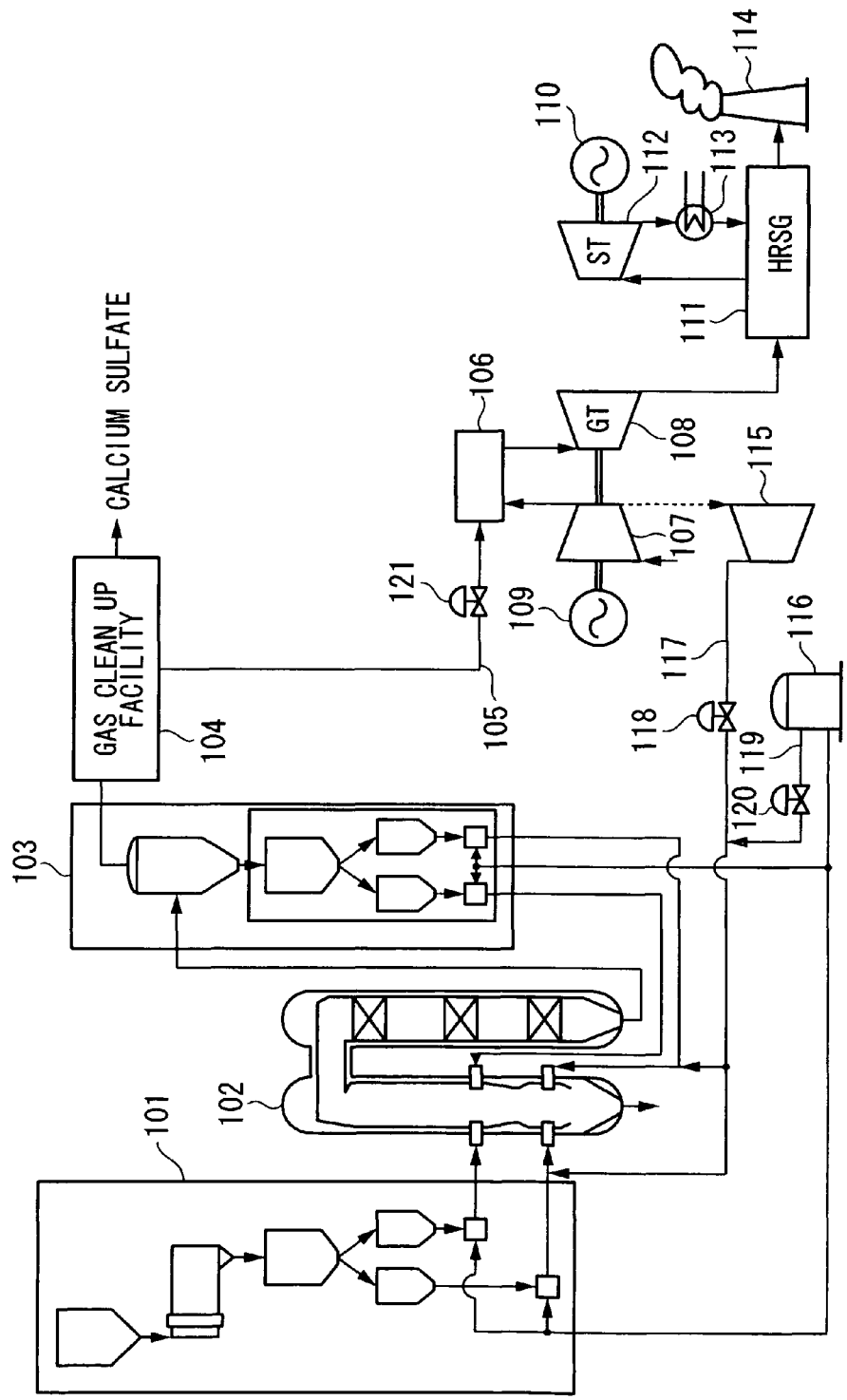
FIG. 29 is a diagram illustrating an overall schematic configuration of a conventional IGCC.

As described above, when the transporting path of the gasifying agent is formed, with the conventional configuration shown in FIG. 29, the flow quantity and pressure of the gasifying agent supplied to the gasifying furnace 102 has been adjusted with the control valve 118 set in the gasifying agent supply path 117. Conversely, with the present embodiment, the flow quantity and pressure of the gasifying agent supplied to the gasifying furnace 2 are adjusted by adjusting the degree of opening of the escaping pressure adjusting valve 23 provided in the gasifying bypass path D and the degree of opening of the IGV valve 27 provided on the opening of the booster 21. Thus, the control valve set in the gasifying supply path A becomes unnecessary, so pressure loss in the gasifying agent supply path A from the axial flow compressor 21 to the gasifying furnace 2 can be suppressed. Accordingly, compared to the case of a conventional configuration wherein the control valve is set in the gasifying agent supply path A (see FIG. 29), the exhaust pressure from the axial flow compressor 21 can be greatly reduced.

Figure 2:
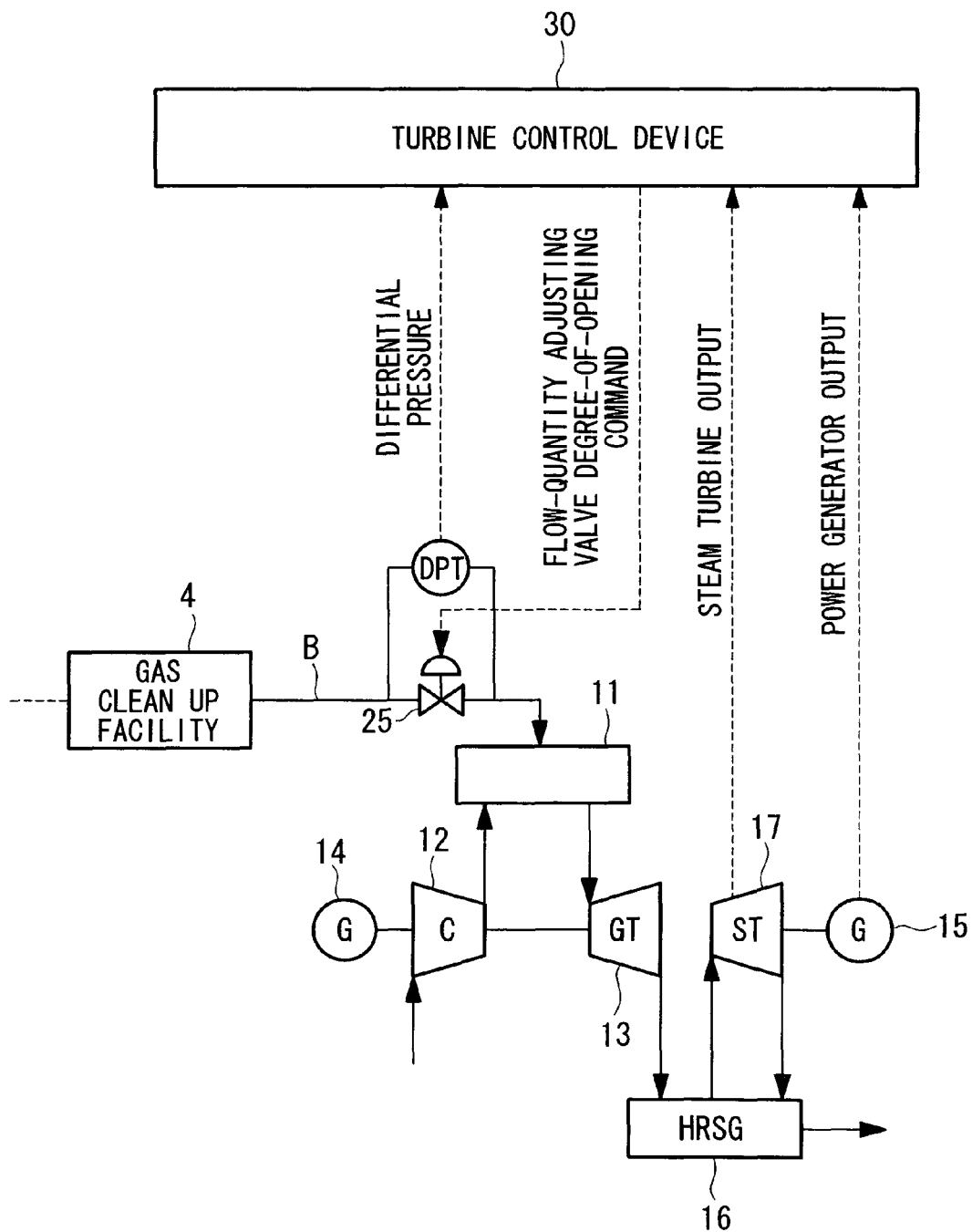
FIG. 2 is a diagram illustrating the primary configuration elements relating to the operation control of a gas turbine with an IGCC relating to the first embodiment according to the present invention.

Next, the operation control device performing the operation control of the IGCC as described above and the method thereof will be described with reference to FIG. 2 through FIG. 6. First, of the IGCC, the operation control relating to the power generating facility 5 will be described with reference to FIG. 2 and FIG. 3. FIG. 2 is a diagram illustrating the primary configuration elements relating to operation control of the gas turbine.

In FIG. 2, the degree of opening of the flow-quantity adjusting valve 25 provided in the flammable gas supply path B which supplies the flammable gas to the combustor 11 is controlled by a turbine control device 30. In the vicinity of the gas turbine 13, a BPT sensor (unshown) for measuring the exhaust gas temperature (hereafter "blade path temperature") of the gas turbine 13 is provided. On the further downstream side of the exhaust gas flow path wherein the BPT sensor is provided, an EXT sensor (unshown) for measuring the exhaust gas temperature in the exhaust duct (hereafter, "exhaust gas temperature") is provided.

For example, a thermocouple or the like is used for the above-described sensor. The temperature measured with the BPT sensor and EXT sensor is provided to the turbine control device 30.

The output of the steam turbine 17 and the output of the power generator 15 are provided to the turbine control device 30. The output of the steam turbine 17 can be obtained with calculations from the input state quantity of the steam turbine 17, for example.

The turbine control device 30 obtains the state quantities relating to the operation state and temperature state of the gas turbine, and sets a flow-quantity adjusting valve degree-of-opening command for controlling the flow quantity of the flammable gas to be supplied to the combustor 11 based on the input signal. Examples of the state quantities relating to the above-mentioned operation state may be the output of the power generator 15, output of the steam turbine 17, and rotation speed or rotation count of the gas turbine 13 and so forth, for example. Examples of the state quantity relating to the temperature state may be the exhaust gas temperature and the blade path temperature and so forth, for example.

Figure 3:
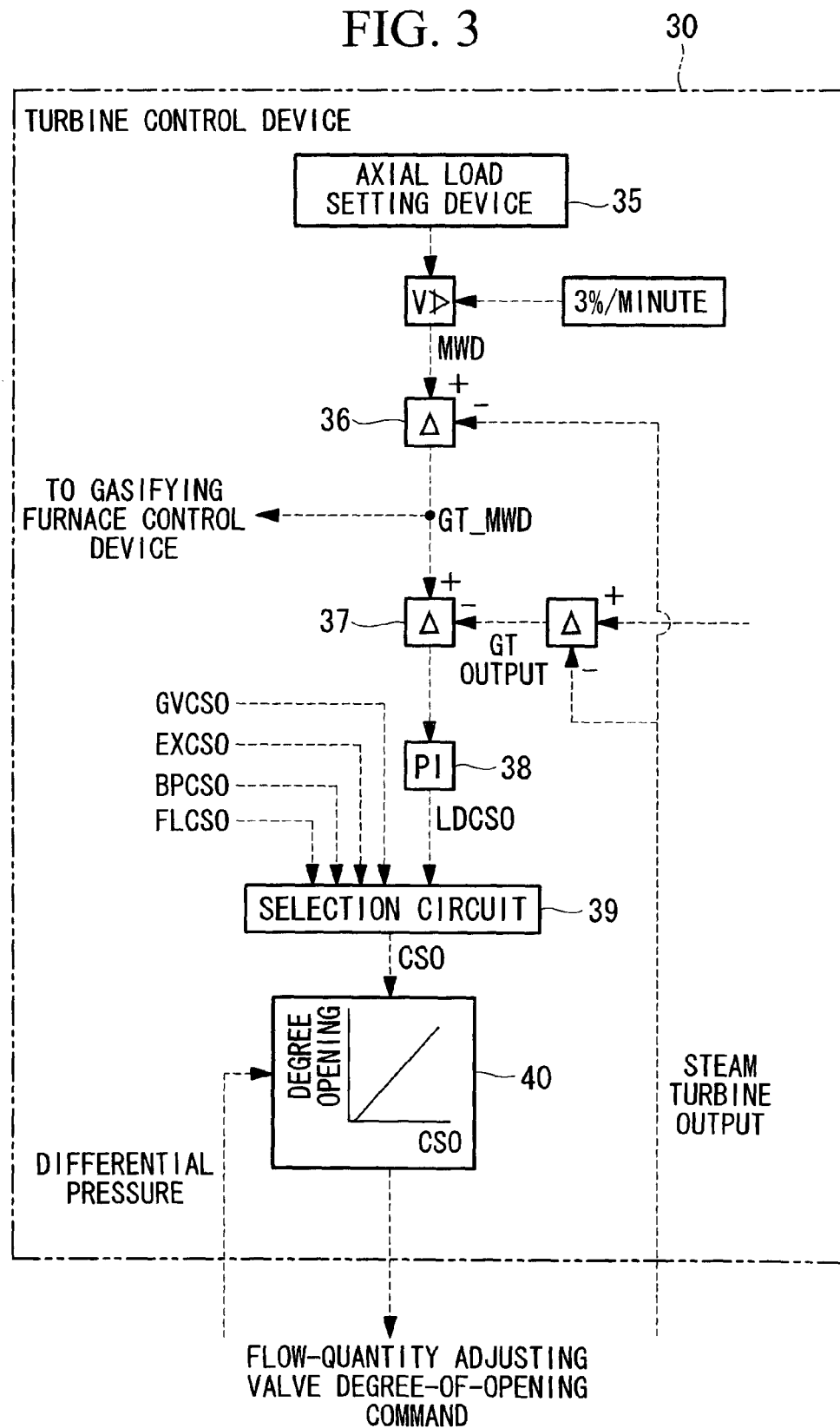
FIG. 3 is a block diagram illustrating a schematic configuration of a turbine control apparatus illustrated in FIG. 2.

FIG. 3 is a block diagram illustrating a schematic configuration of the turbine control device 30.

First, the target load for the power generator output is set by an axial load setting device 35, whereby the power generator command MWD is set as the plant load change rate (e.g. 3% per minute) changes toward the target load. A subtractor 36 computes a gas turbine output command GT_MWD by subtracting the output of the steam turbine from the power generator command MWD. The gas turbine output command GT_MWD is provided to a subtractor 37, and also is transmitted to a later-described gasifying furnace control device 50 (see FIG. 4).

The gas turbine output obtained by subtracting the steam turbine output from the power generator output is provided to the subtractor 37. The subtractor 37 obtains the difference by subtracting the gas turbine output from the gas turbine output command GT_MWD. This difference is subjected to PI control performed with a PI controller 38, whereby a load control command LDCSO is obtained for the gas turbine output to match the gas turbine output command GT_MWD. The load control command LDCSO is provided to a selection circuit 39.

In addition to the above-mentioned load control command LDCSO, a governor control command GVCSO computed based on the number of shaft rotations, temperature control commands EXCSO and BPCSO computed based on temperature, and a fuel control command FLCSO computed based on fuel quantity are also provided to the selection circuit 39. The selection circuit 39 selects the lowest value from the control commands, and outputs this as the control command CSO to a valve degree of opening setting unit (third setting unit) 40. The valve degree of opening setting unit 40 has a table or relational expression associating the valve degree of opening of the flow-quantity adjusting valve 25 and the control command CSO beforehand. The valve degree of opening setting unit 40 obtains the valve degree of opening corresponding to the control command CSO provided from the selection circuit 39 by employing the table or computation expression, and outputs the valve degree of opening as a flow-quantity adjusting valve degree-of-opening command. The valve degree of opening setting unit 40 uses a parameter relating to before-and-after difference of the flow-quantity adjusting valve 25 in the case of calculating the degree of opening (flow quantity) corresponding to the control command CSO.

Figure 4:
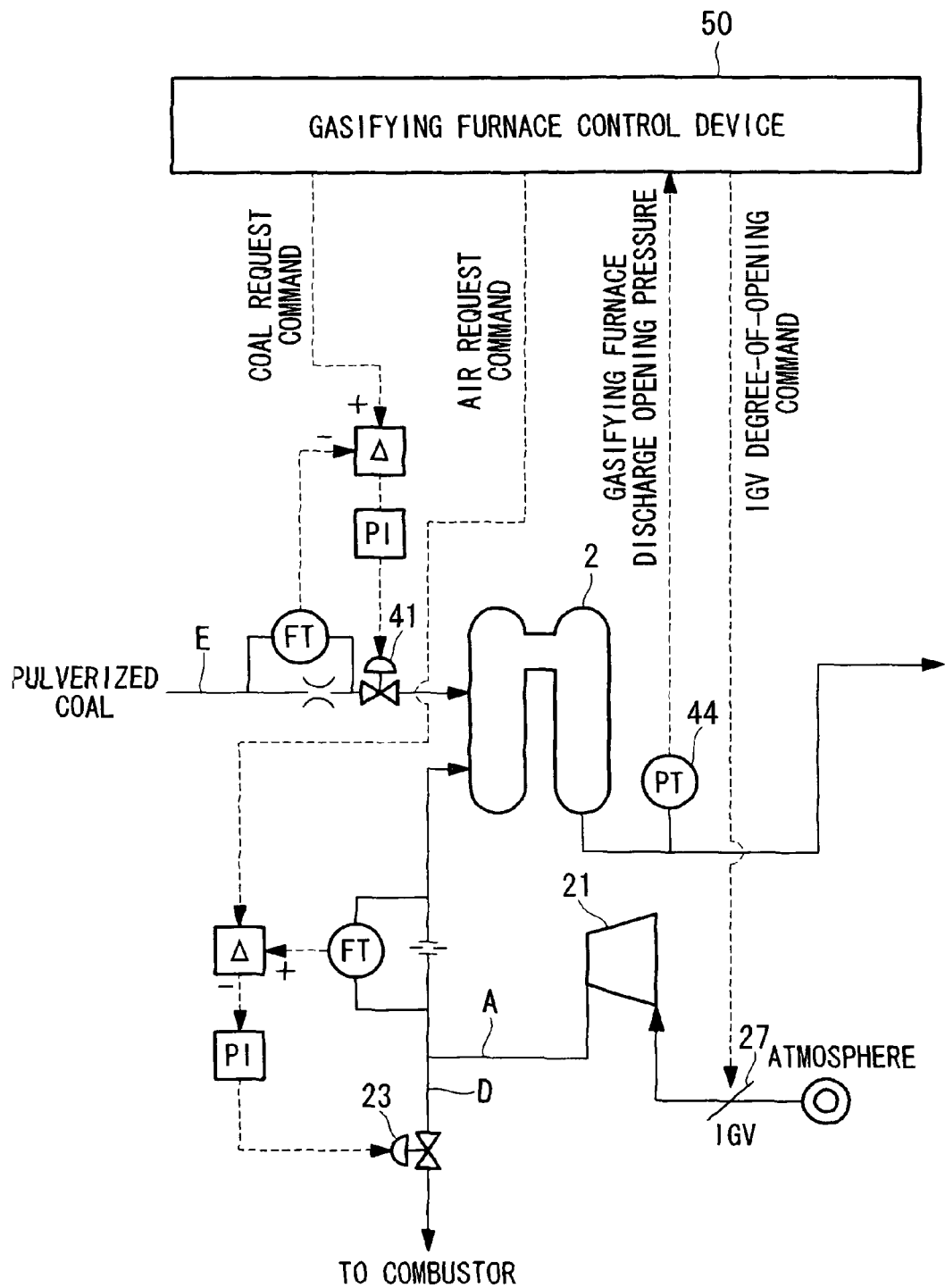
FIG. 4 is a diagram illustrating the primary configuration elements relating to the control of a gasifier furnace with the IGCC relating to the first embodiment according to the present invention.

Next, the controls of the gasifying furnace 2 with the IGCC shown in FIG. 1 will be described with reference to FIG. 4 and FIG. 5. FIG. 4 is a diagram showing the primary configuration elements relating to the control of the gasifying furnace 2.

As shown in FIG. 4, a coal flow-quantity adjusting valve (fourth control valve) 41 for adjusting the quantity of pulverized coal input into the gasifying furnace 2 is provided in the coal supply path (solid fuel supply path) E to supply pulverized coal from the coal supply facility 1 to the gasifying furnace 2. With the flammable gas supply path B which guides the flammable gas generated in the gasifying furnace 2 to the combustor 11 of the power generating facility 5, a pressure sensor 44 for measuring the gasifying furnace discharge opening pressure is provided in the vicinity of the discharge opening of the gasifying furnace 2. The measurement value of the pressure sensor 44 is output to the gasifying furnace control device 50. As described above, the escaping pressure adjusting valve 23 is provided in the gasifying agent bypass path D, and the IGV valve 27 is provided on the absorbing side of the axial flow compressor 21.

The degree of opening of the coal flow-quantity adjusting valve 41, escaping pressure adjusting valve 23, and IGV valve 27 are each controlled based on a coal request command (solid fuel request quantity), air request command (flammable gas request quantity), and IGV degree-of-opening command output from the gasifying furnace control device 50.

Figure 5:
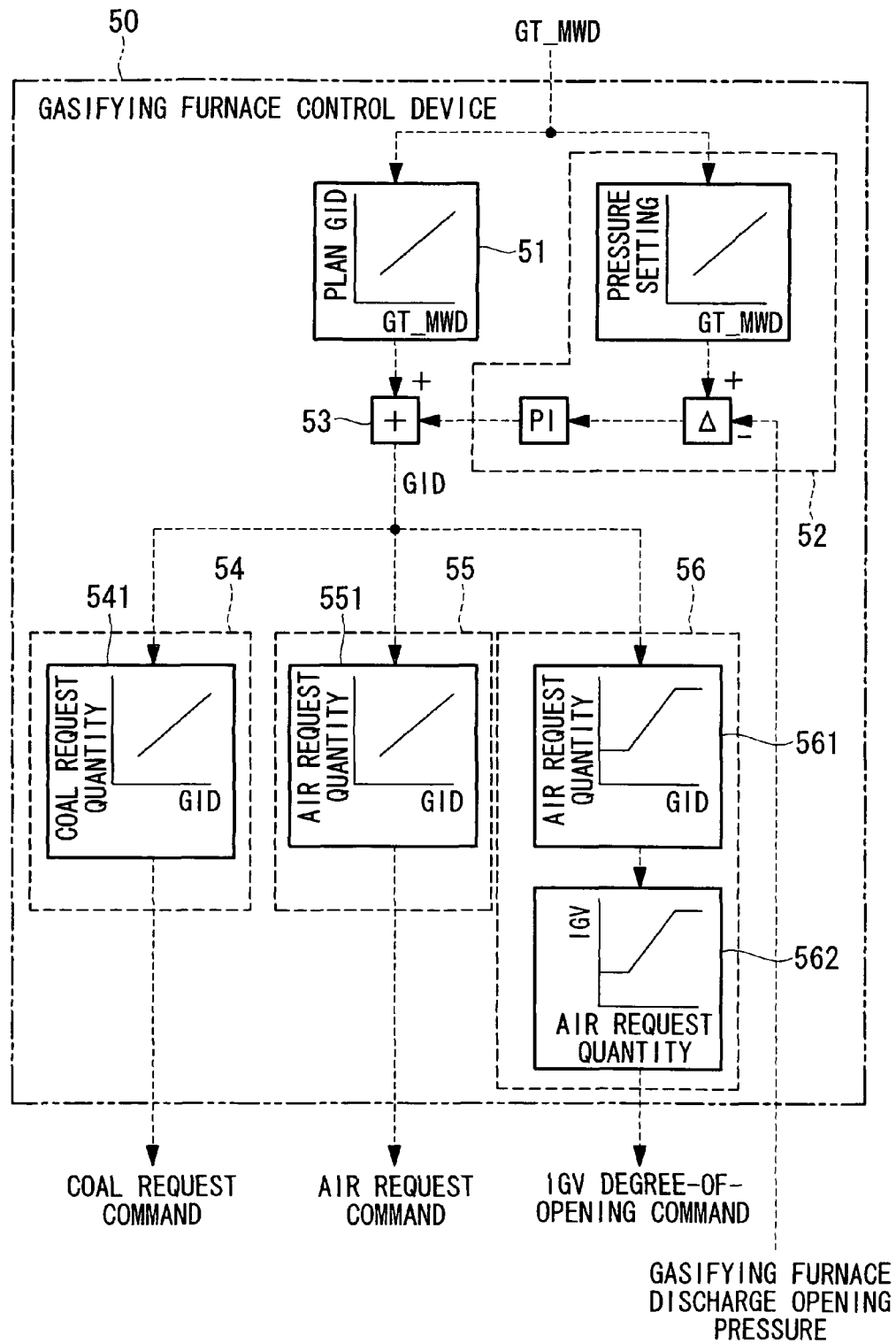
FIG. 5 is a block diagram illustrating a schematic configuration of the gasifier furnace control apparatus illustrated in FIG. 4.

FIG. 5 is a block diagram illustrating a schematic configuration of the gasifying furnace control device 50. As shown in FIG. 5, the gas turbine output command GT_MWD obtained with the above-described turbine control device 30 is input in the gasifying furnace control device 50. With the gasifying furnace control device 50, the gas turbine control GT_MWD is provided to a plan GID (gasifying furnace overall command) setting unit 51 and a correcting value computing unit 52. The input signal of the correcting value computing unit 52 may use the output signal of the plan GID (gasifying furnace overall command) setting unit 51.

The plan GID setting unit 51 sets a plan GID in order to subject the gasifying furnace 2 beforehand as to the load of the gas turbine 13. The plan GID setting unit 51, for example, has a table or relational expression wherein the gas turbine output command GT_MWD and plan GID are associated, and the plan GID corresponding to the gas turbine output command GT_MWD from the turbine control device 30 is obtained using this table or relational expression.

The correction value computing unit 52 obtains a correction value for correcting the above-mentioned GID, for example, from the relation between the gas turbine output command GT_MWD and gasifying furnace discharge opening pressure.

Specifically, the correction value computing unit 52 has a table or relational expression wherein the gas turbine output command GT_MWD and the discharge opening pressure command of the gasifying furnace 2 are associated, and obtains a pressure command corresponding to the gas turbine output command GT_MWD from the turbine control device 30, using the table or relational expression, and further obtains the deviation between the pressure command and the actual gasifying furnace discharge opening pressure (hereafter "pressure deviation $\Delta P$"), and outputs the value wherein proportional-integral control is performed on the pressure deviation $\Delta P$ as a correction value, to an adder 53.

The plan GID set by the plan GID setting unit 51 and the correction value obtained with the correction value computing unit 52 are added together with the adder 53, whereby the gasifying furnace overall command GID is obtained. The gasifying furnace overall command GID is output to a requested coal quantity setting unit (fourth setting unit) 54, requested air quantity setting unit (first setting unit) 55, and IGV degree of opening setting unit (second setting unit) 56.

The coal request quantity setting unit 54 has a function unit 541 having a table or computation expression having correlated the gasifying furnace overall command GID and the requested coal quantity. The function unit 541 uses the table or computation expression to obtain the requested coal quantity corresponding to the gasifying furnace overall command GID, and generates a coal request command in accordance with the request quantity thereof.

The requested air quantity setting unit 55 has a function unit 551 having a table or computation expression having correlated the gasifying furnace overall command GID and requested air quantity. The function unit 551 uses the table or computation expression to obtain the requested air quantity corresponding to the gasifying furnace overall command GID, and generates an air request command in accordance with the request quantity thereof.

The IGV degree of opening setting unit 56 has a function unit 561 having a table or computation expression having correlated the gasifying furnace overall command GID and requested air quantity, and a function unit 562 having a table or computation expression having correlated the requested air quantity and the IGV degree of opening. The function adding the function portions 561 and 562 may be the same function as the function unit 551. The function unit 561 obtains the requested air quantity corresponding to the gasifying furnace overall command GID with the above-mentioned table or the like, and further, the function unit 562 obtains the IGV degree of opening corresponding to the requested air quantity, thereby generating an IGV degree-of-opening command according to the IGV degree of opening.

The coal request command output from the requested coal quantity setting unit 54 is employed as the control quantity of the coal flow-quantity adjusting valve 41 shown in FIG. 4, and the degree of opening of the coal flow-quantity adjusting valve 41 based on the value herein is adjusted with an unshown control unit, whereby the coal input quantity to the gasifying furnace 2 is adjusted.

The air request command output from the requested air quantity setting unit 55 is employed as the degree of opening control quantity of the escaping pressure adjusting valve 23.

Specifically, the difference between the requested air quantity set by the requested air quantity setting unit 55 and the actual gasifying agent supplied to the gasifying furnace 2 is calculated, whereby the escaping pressure adjusting valve 23 is adjusted to an degree of opening so that the difference therein is eliminated. The degree of opening control of the escaping pressure adjusting valve 23 is performed with an unshown control unit (first control unit). With the escaping pressure adjusting valve being adjusted to such an degree of opening, the excess portion of the compressed air supplied from the axial flow compressor 21 is returned to the combustor 11 via the escaping pressure adjusting valve 23, whereby the pressure and flow quantity of the gasifying agent supplied to the gasifying furnace 2 is adjusted to an appropriate quantity.

The IGV degree-of-opening command output from the IGV degree of opening setting unit 45 is employed as the valve degree-of-opening command for the IGV valve 27. The degree of opening of the IGV valve 27 is adjusted by an unshown control unit (second control unit) based on the IGV degree-of-opening command, whereby the air quantity supplied to the axial flow compressor 21 is adjusted to an appropriate quantity.

With FIG. 5, the above-mentioned three setting units are illustrated, but additionally, setting units may be provided to set the input quantity of oxygen and char.

As described above, according to the IGCC and the operation control apparatus and method relating to the present embodiment, a gasifying agent bypass path D which branches from the gasifying agent supply path A is provided, and the escaping flow quantity and pressure of the gasifying agent to the gasifying agent bypass path D is adjusted with the escaping pressure adjusting valve 23, whereby the flow quantity and pressure of the gasifying agent supplied to the gasifying furnace 2 can be adjusted. Thus, since setting a flow quantity valve in the gasifying agent supply path A becomes unnecessary, pressure loss in the gasifying agent supply path A from the axial flow compressor 21 to the gasifying furnace 2 can be suppressed. Therefore, compared to the case of a conventional configuration (see FIG. 29) wherein a control valve 118 is disposed in the gasifying agent supply path A, the discharge pressure of the axial flow compressor 21 can be greatly reduced.

Further, as shown in FIG. 1, the gasifying agent bypass path D is connected on the downstream side of the compressor 12 discharge opening, enabling the gasifying agent flowing through the gasifying agent bypass path D which branches from the gasifying agent supply path A is used as a portion of cooled air which cools the combustor 11 and gas turbine 13. Thus, the pressure of the discharged air from the compressor 12 can be suppressed, and output efficiency of the gas turbine 13 can be further improved. As a result, the transmission end efficiency with the present embodiment can be improved by several percent as a relative value, compared to the conventional method. The improvement to the transmission end efficiency is the same with the other embodiments described below.

Figure 6:
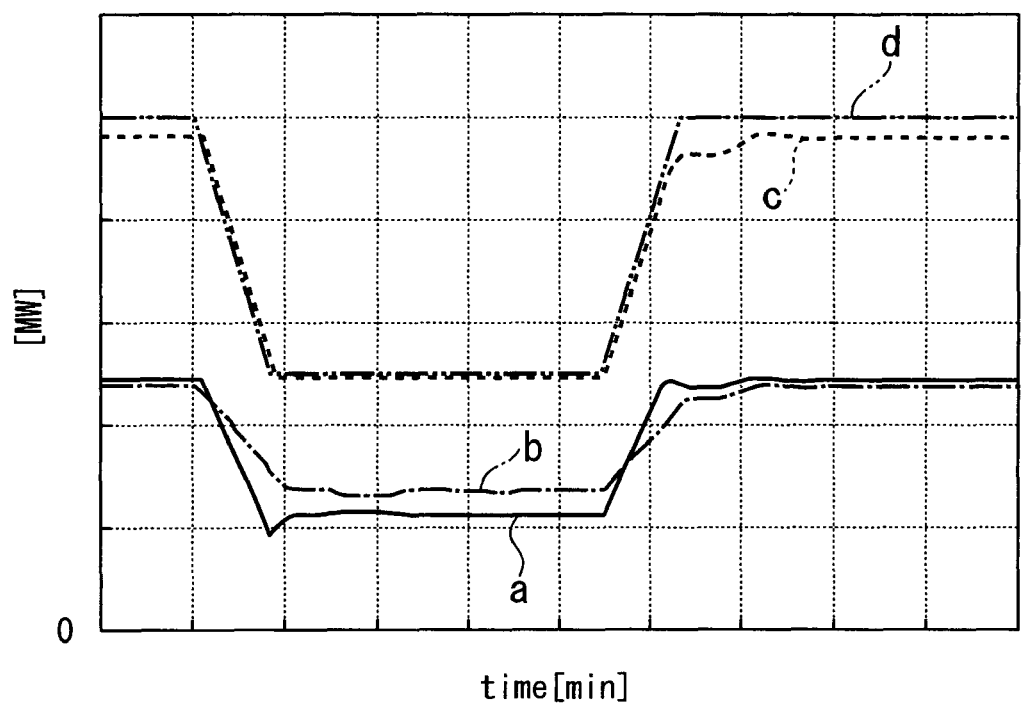
FIG. 6 is a graph showing the following capability of system output as to a load command of the IGCC relating to the first embodiment according to the present invention.

FIG. 6 shows a graph expressing the following capability of facility output as to the load command of the IGCC relating to the present embodiment. In FIG. 6, the horizontal axis represents time, and the vertical axis represents generated power output, i.e., the sum of generators 14 and 15. In FIG. 6, property a denotes gas turbine output, b denotes steam turbine output, c denotes facility output, and d denotes a power generator command MWD. As shown in this diagram, the following capability as to the power generator command MWD is favorable.

Second Embodiment

Figure 7:
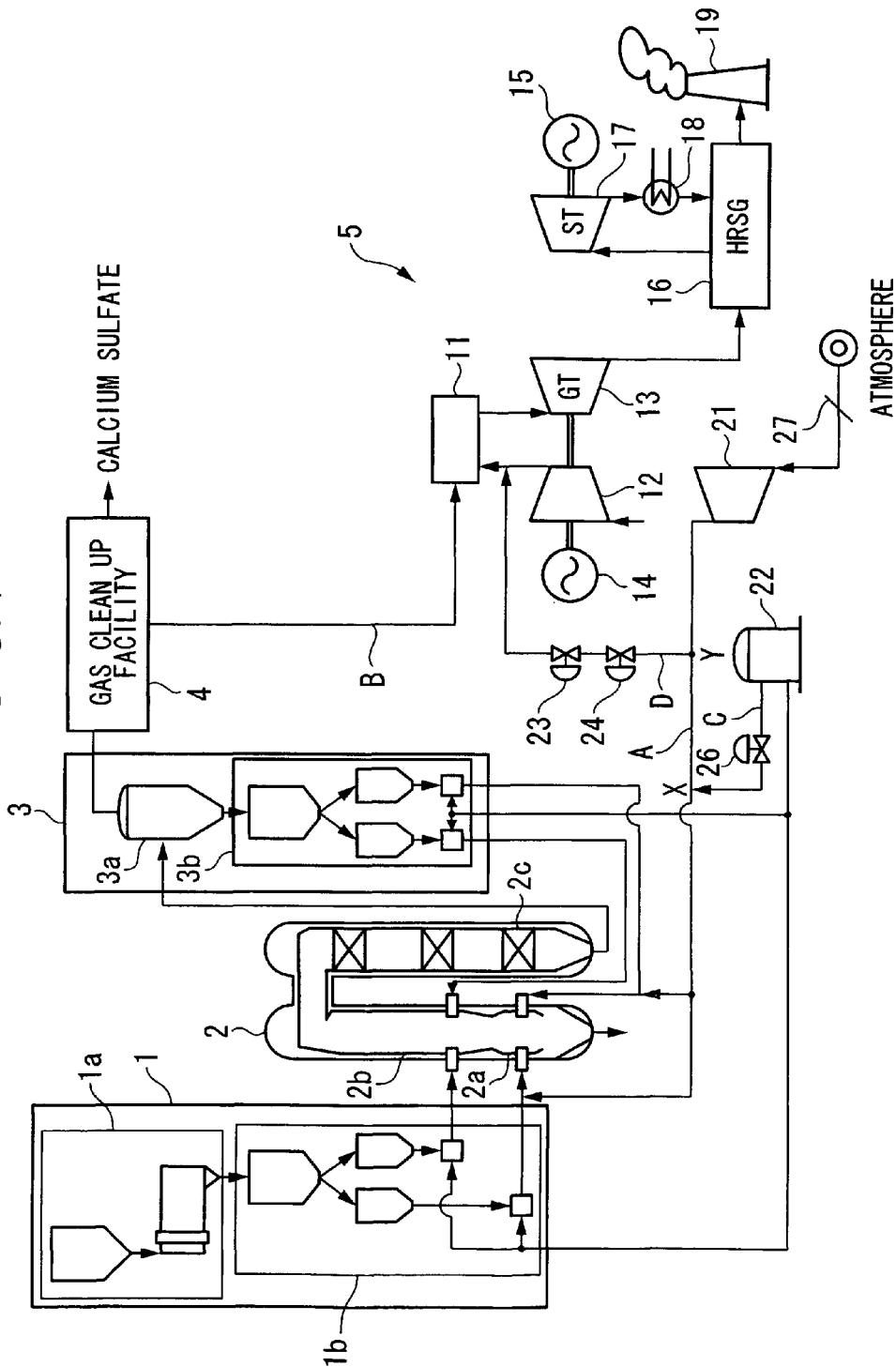
FIG. 7 is a diagram illustrating an overall schematic configuration of the IGCC relating to a second embodiment according to the present invention.

Next, a second embodiment according to the present invention will be described. With the IGCC relating to the above-described first embodiment, the flow-quantity adjusting valve 25 (see FIG. 1) is provided to adjust the flow quantity of the flammable gas supplied to the combustor 11 on the flammable gas supply path B. The IGCC relating to the present embodiment differs from the IGCC related to the above-described first embodiment in the points wherein the flow-quantity adjusting valve 25 is removed, as shown in FIG. 7.

Thus, with the IGCC relating to the present embodiment, since the flow-quantity adjusting valve 25 is not provided herein, the flow quantity adjustment of flammable gas to the combustor 11 is performed by the controls of the gasifying furnace 2. Hereafter, the control method of the IGCC relating to the present embodiment will be described in detail.

Figure 8:
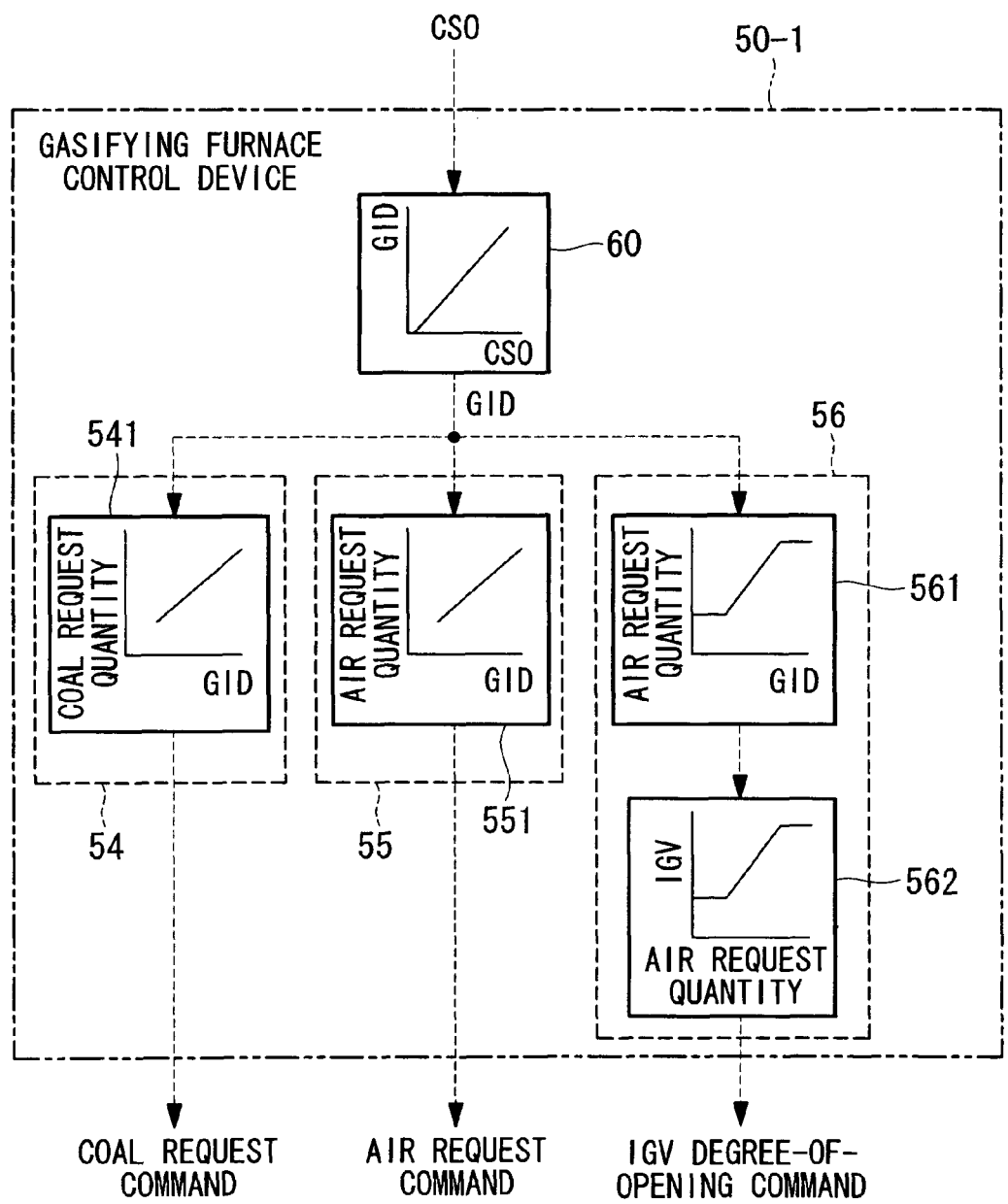
FIG. 8 is a block diagram illustrating a schematic configuration of a gasifier furnace control apparatus relating to the second embodiment according to the present invention.

FIG. 8 is a diagram illustrating a configuration with a gasifying furnace control device 50-1 relating to the present embodiment. As shown in FIG. 8, the gasifying furnace control device 50-1 obtains a control command CSO as input information from the turbine control device 30, and includes a GID setting unit 60 to obtain a gasifying furnace overall command GID from the control command CSO, and the requested coal quantity setting unit 54, requested air quantity setting unit 55, and IGV degree of opening setting unit 56 which generate a coal request command, air request command, and IGV degree-of-opening command based on the gasifying furnace overall command GID set by the GID setting unit 60. The gasifying furnace overall command GID here is only obtained with the GID setting unit 60, but the correction signal of the inner-furnace pressure value can be added similar to the correction value computation unit 52 in FIG. 5 to obtain the gasifying furnace overall command GID.

The GID setting unit 60 has a table or relational expression wherein the control command CSO and gasifying furnace overall command GID are associated, whereby a gasifying furnace overall command GID corresponding to the control command CSO from the turbine control device 30 is obtained by employing the table or relational expression herein, and the gasifying furnace overall command GID is output to the various setting units 54, 55, and 56. Thus, similar to the above-described first embodiment, a coal request command, air request command, and IGV degree-of-opening command are generated based on the gasifying furnace overall command GID, and the degree of opening of the coal flow-quantity adjusting valve 41, escaping pressure adjusting valve 23, and IGV valve 27 are controlled based on such commands, whereby the flow quantity of coal and flow quantity of gasifying agent supplied to the gasifying furnace 2, and the air flow quantity supplied to the axial flow compressor 21 can be appropriately adjusted.

As described above, according to the IGCC relating to the present embodiment and the operation control device and method thereof, the flow quantity of coal and gasifying agent supplied to the gasifying furnace 2 are set based on the control command CSO which is set with the gas turbine control device 30. The control command CSO correlates to the control quantity of the flow quantity of flammable gas supplied to the combustor 11, so by subjecting the gasifying furnace 2 to control based on the control command CSO, the flow quantity of the flammable gas output from the gasifying furnace 2 can be adjusted to a flow quantity corresponding to the gas turbine output command at the time thereof. Thus, with the present embodiment, by causing the adjustment function for flammable gas flow quantity by the flammable gas flow-quantity adjusting valve 25 to be performed by the controls in the gasifying furnace 2, the flammable gas flow-quantity adjusting valve 25 is not needed, thereby facilitating facility efficient improvement and simplification.

According to the IGCC relating to the present embodiment, the flammable gas flow-quantity adjusting valve 25 is not needed, whereby the pressure loss which had been generated in the flammable gas supply path B can be reduced, enabling further suppression of the pressure of the discharged air from the compressor 12.

Figure 9:
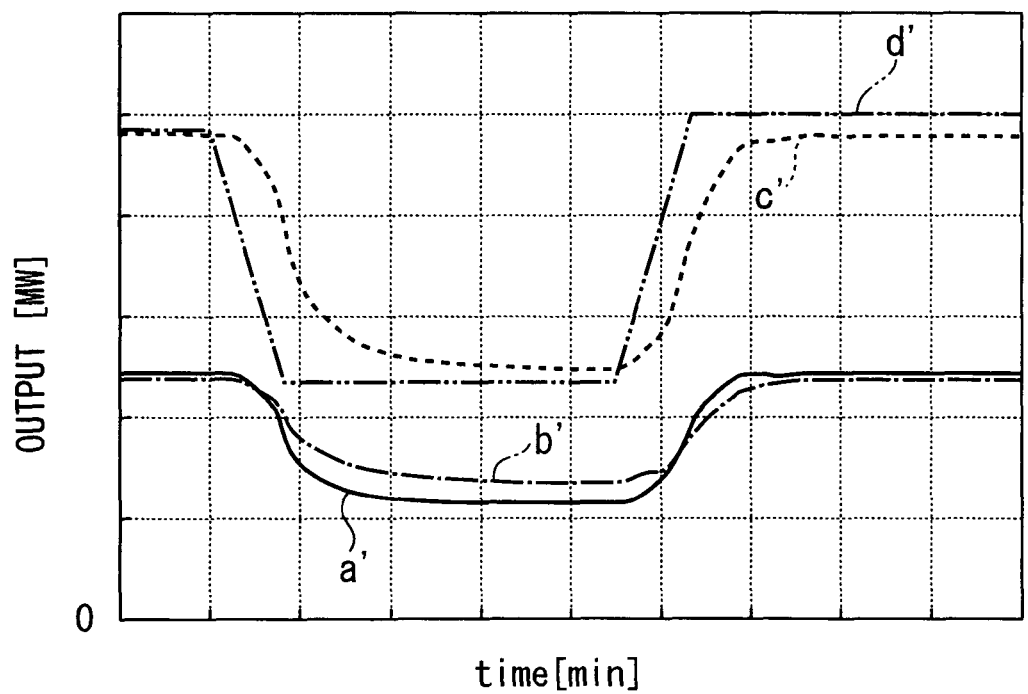
FIG. 9 is a graph showing the following capability of system output as to a load command of the IGCC relating to the second embodiment according to the present invention.

FIG. 9 shows a graph expressing the following capability of facility output as to the load command of the IGCC relating to the present embodiment. In FIG. 9, the horizontal axis denotes time and the vertical axis denotes power generating output, i.e. the total of the power generators 14 and 15. In FIG. 9 the property a' denotes gas turbine output, b' denotes steam turbine output, c' denotes facility output, and d' denotes power generating command MWD. As shown in the diagram, the following capability as to the power generating command MWD is less than the following capability of the IGCC relating to the first embodiment shown in FIG. 6, but indicates that there remains sufficient following capability.

With the present embodiment, a GID setting unit 60 to set the gasifying furnace overall command GID from the control command CSO is provided on the gasifying furnace control device 50-1, but instead an arrangement may be made wherein the GID setting unit 60 is provided on the gas turbine control device 30, and the gasifying furnace overall command GID set by the GID setting unit 60 is input in the gasifying furnace control device.

Figure 10:
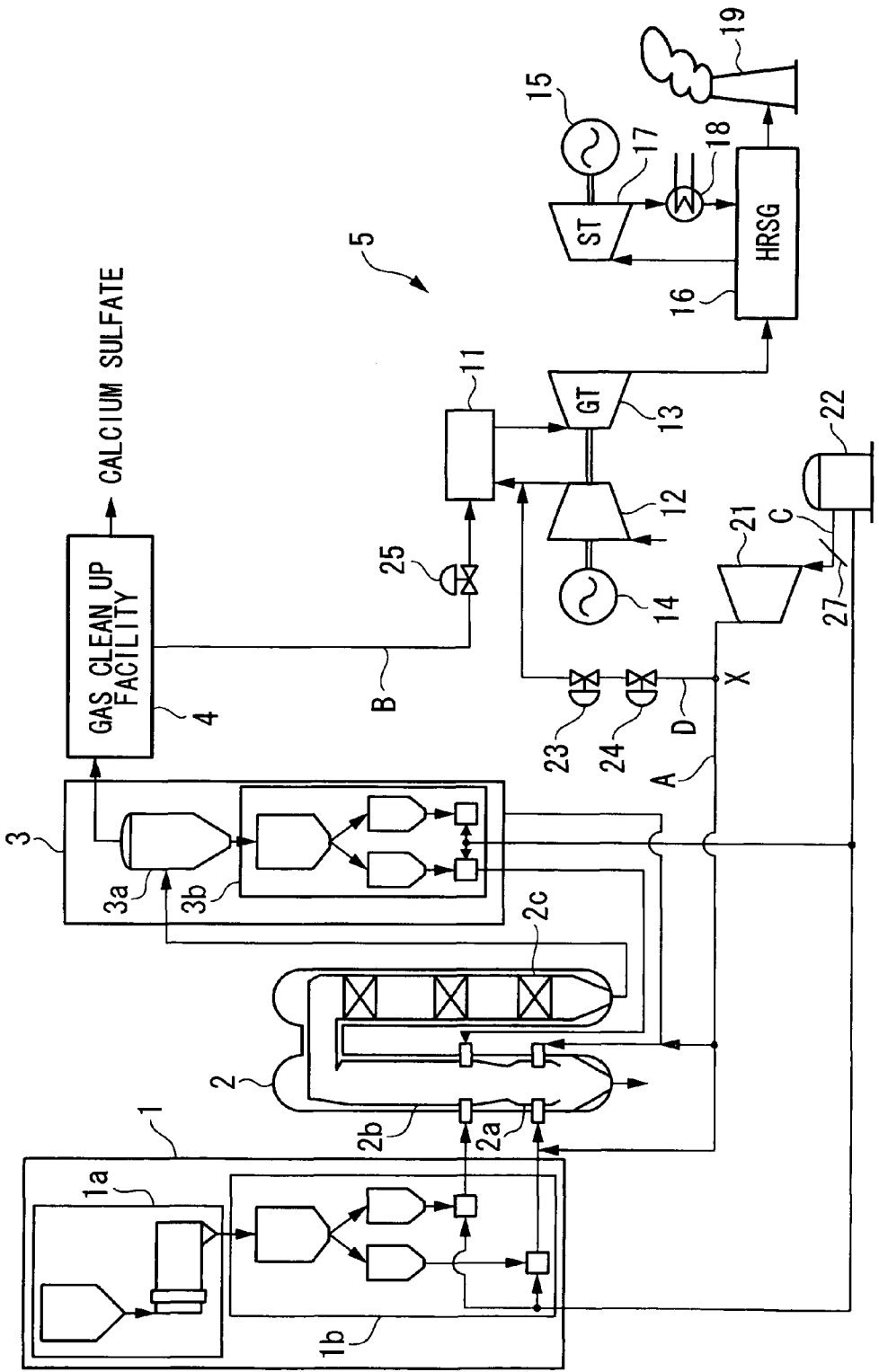
FIG. 10 is a diagram showing an overall schematic configuration of an IGCC employing an oxygen-blowing method.

With each of the above-described embodiments, a case wherein an air-blowing method employed to supply mixed air as the gasifying agent has been described, but instead an oxygen blowing method to supply oxygen as the gasifying agent may be employed. In this case, as shown in FIG. 10, the oxygen supply path C is connected to the input opening side of the axial flow compressor 21. The axial flow compressor 21 compresses the oxygen segregated with the air separating facility 22 and boosts the pressure thereof as the gasifying agent, and inputs this into the gasifying agent supply path A. The flow quantity and pressure of the gasifying agent supplied to the gasifying agent supply path A are adjusted with the escaping pressure adjustment valve 23 and IGV degree of opening 27 in the gasifying agent bypass path D. With such a configuration, the control valve 26 (see FIG. 1) provided in the oxygen supply path C is not necessary.

Next, the IGCC relating to the above-described embodiments and the operation control apparatus and method thereof will be described with modifications.

First Modification

With the above-described embodiments, the IGV degree of opening setting unit 56 with the gasifying furnace control device 50 and 50-1 may further comprise a first correcting unit 563 to correct the IGV degree-of-opening command in the direction to increase the volume of air supplied to the axial flow compressor 21 according to functional decline by aged deterioration of the axial flow compressor 21.

Figure 11:
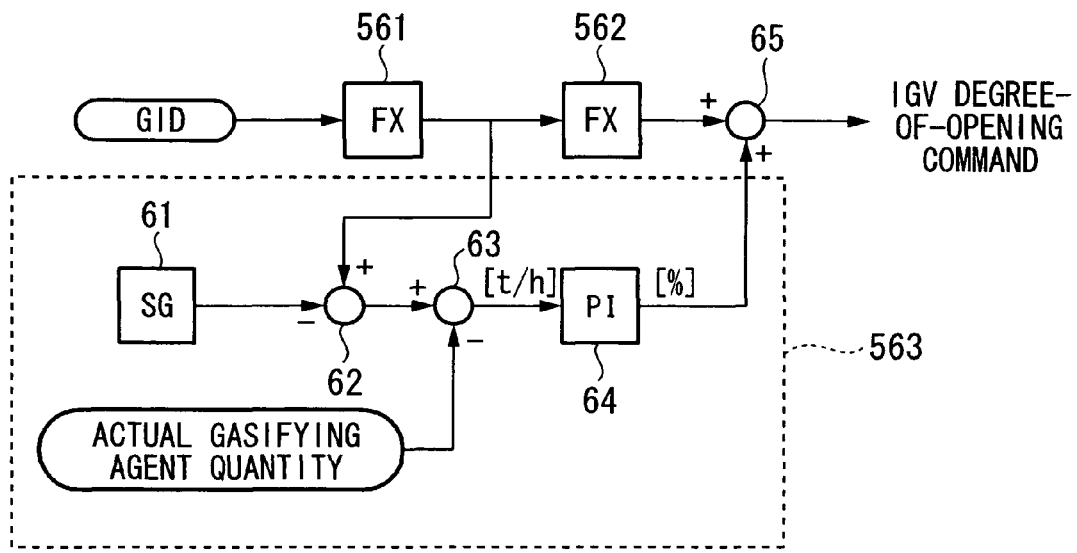
FIG. 11 is a block diagram illustrating a schematic configuration of an IGV degree of opening setting unit relating to a first modification according to the present invention.

FIG. 11 is a block diagram illustrating a schematic configuration of the IGV degree of opening setting unit relating to the first modification of the present invention. As shown in FIG. 11, the first correcting unit 563 includes a subtractor 62 to obtain the air quantity which is somewhat less than the requested air quantity as the corrected air request quantity by obtaining the difference between the requested air quantity set based on the gasifying furnace overall command GID and the adjusted value output from a signal generator 61 (e.g. flow quantity deviation quantity to start the correction control), a subtractor 63 to obtain the difference between the corrected air request quantity and the actual gasifying agent quantity supplied to the gasifying furnace 2, and a proportional-integral controller 64 to obtain the IGV degree of opening for eliminating the difference obtained by the subtractor 63 as the IGV degree of opening corrected value. However, we will say that the lowest value of the proportional-integral controller 64 is 0 (zero).

The IGV degree of opening correction value output from the proportional-integral controller 64 is added to the IGV degree of opening corresponding to the requested air quantity by the adder 65, and is output as a final IGV degree-of-opening command. The degree of opening of the IGV valve 27 is controlled based on this IGV degree-of-opening command.

For example, as the boosting properties of the axial flow compressor 21 decrease due to aging deterioration or the like, the flow quantity of the gasifying agent input from the axial flow compressor 21 to the gasifying agent supply path A decreases. Accordingly, as described above, by correcting the IGV degree-of-opening command in the direction to increase the air quantity supplied to the axial flow compressor 21 with consideration for the properties of the axial flow compressor 21, insufficient supply of the gasifying agent can be avoided, and a sufficient quantity of gasifying agent can be constantly supplied to the gasifying agent supply path A.

Predetermined value output from the signal generator 61 is subtracted from the requested air quantity with the subtractor 62 for the following reason. That is to say, when the requested air quantity set with the function unit 561 is employed as it is, the excess portion of the compressed air input from the axial flow compressor 21 becomes zero or is increased, whereby the escaping pressure adjusting valve 23 can be repeatedly opened and closed.

Figure 12:
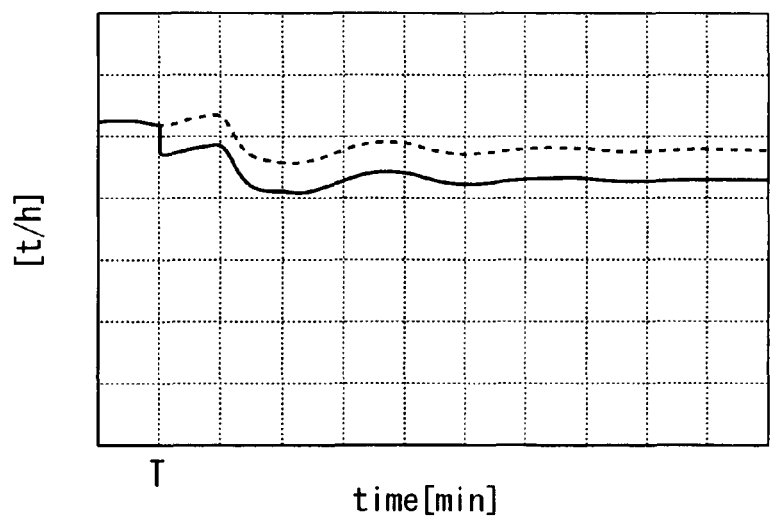
FIG. 12 is a diagram illustrating flow changes to a gasifying agent input into a gasifying agent supply path in a case that the IGV degree of opening setting unit does not have a first correcting unit.
Figure 13:
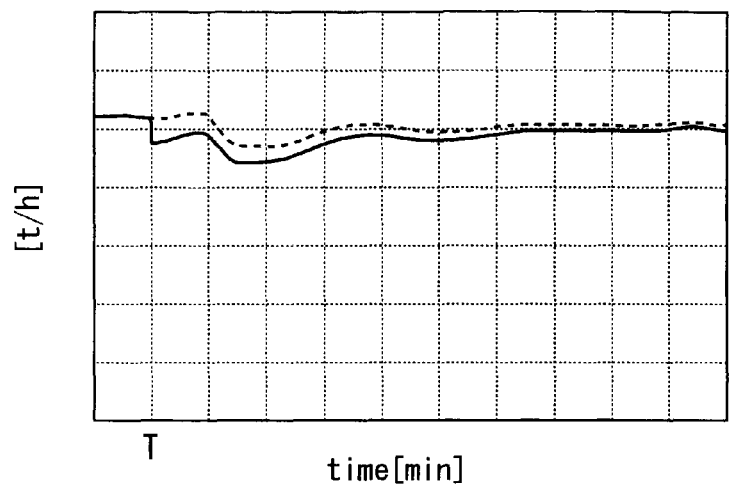
FIG. 13 is a diagram illustrating flow changes to a gasifying agent input into a gasifying agent supply path in a case that the IGV degree of opening setting unit has a first correcting unit.

FIG. 12 and FIG. 13 are diagrams illustrating the effects of the first correcting unit 563. FIG. 12 shows the flow quantity change of the gasifying agent input in the gasifying agent supply path A in the case that the IGV degree of opening setting unit 56 does not have a first correcting unit 563, and FIG. 13 shows the flow quantity change of the gasifying agent input in the gasifying agent supply path A in the case that the IGV degree of opening setting unit 56 has a first correcting unit 563. With FIG. 12 and FIG. 13, the solid lines indicate the flow quantity of gasifying agent input in the gasifying agent supply path A, and the broken lines indicate the requested air quantity set with the IGV degree of opening setting unit 56.

For example, in the case that functional decrease occurs with the axial flow compressor 21 at point-in-time T, in the case there is no first correcting unit 563, the input quantity of gasifying agent as to the requested air quantity does not follow as shown in FIG. 12, and an insufficient supply of gasifying agent occurs. Conversely, as shown in FIG. 13, in the case there is a first correcting unit 563, even if a functional decrease occurs with the axial flow compressor 21 at point-in-time T, the input quantity of the gasifying agent follows the requested air quantity, whereby insufficient supply does not occur.

Second Modification

With the above-described embodiments, the requested coal quantity setting unit 54 with the gasifying furnace control devices 50 and 50-1 may further have a second correction unit 542 to correct the requested coal quantity obtained based on the gasifying furnace overall command GID according to the calories of the coal supplied to the gasifying furnace 2.

Figure 14:
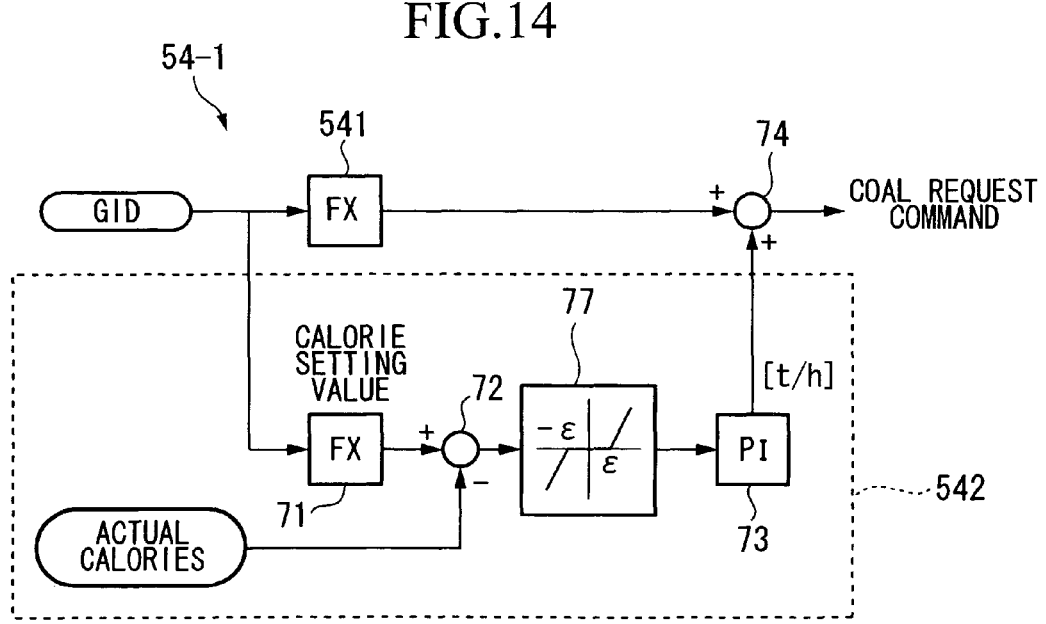
FIG. 14 is a block diagram illustrating a schematic configuration of a requested coal quantity setting unit relating to a second modification.

FIG. 14 is a block diagram illustrating a schematic configuration of the requested coal quantity setting unit relating to the second modification of the present invention. As shown in FIG. 14, with the requested coal quantity setting unit 54-1, the second correction unit 542 has a calorie setting unit 71 to set the calories based on the gasifying furnace overall command GID, the subtractor 72 to compute the difference between the calories set by the calorie setting unit 71 and the actual calories of the generated gas generated with the gasifying furnace 2, the function generator 77 to determine whether or not the difference computed with the subtractor 72 is greater than the calorie deviation to start the correction control, and a proportional-integral controller 73 to obtain the requested coal quantity for eliminating the difference thereof as the requested coal corrected quantity in the case determination is made at the function generator 77 that the difference is greater than the calorie deviation to start correction control.

Specifically, the above-mentioned function generator 77 outputs 0 (zero) in the case the difference from the subtractor 72 is within a predetermined range set beforehand, and outputs the difference as is from the subtractor 72 in the case the difference is outside a predetermined range. The requested coal correction quantity from the proportional-integral controller 73 is added to the requested coal quantity which is set by an adder 74 based on the gasifying furnace overall command GID whereby the requested coal quantity is corrected, and a final requested coal command is generated. The requested coal command may be arranged so as to be set associated with the gasifying furnace air flow quantity command.

Thus, according to the calories of the coal, the requested coal amount which is set based on the gasifying furnace overall command GID is corrected, whereby even in the case that the calories of the pulverized coal to be supplied to the gasifying furnace 2 or the coal properties vary due to coal-type switching, the calories of the flammable gas output from the gasifying furnace 2 can be stabilized. Consequently, the desired gas turbine output can be obtained.

Figure 15:
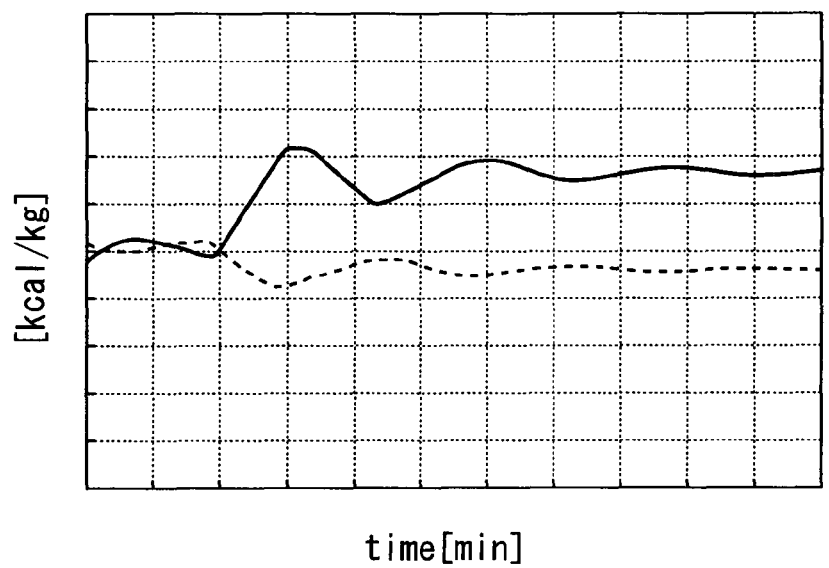
FIG. 15 is a diagram illustrating the following capability of flammable gas calorie variance in the case that the requested coal quantity setting unit does not have a second correcting unit.
Figure 16:
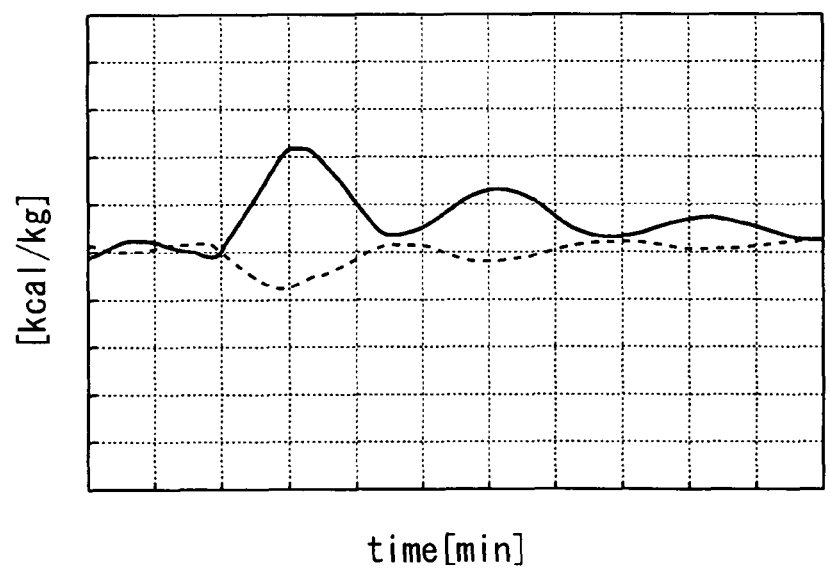
FIG. 16 is a diagram illustrating the following capability of flammable gas calorie variance in the case that the requested coal quantity setting unit has a second correcting unit.

FIG. 15 and FIG. 16 are diagrams showing the advantages of the second correction unit 542. FIG. 15 shows calorie variance of the flammable gas in the case that the requested coal quantity setting unit 54 does not have the second correction unit 542, and FIG. 16 shows calorie variance of the flammable gas in the case that the requested coal quantity setting unit 54 has the second correction unit 542. In FIG. 15 and FIG. 16, the solid lines indicate the calories of the flammable gas output from the gasifying path 2, and the broken lines are calorie setting values of the flammable gas determined based on the gasifying furnace overall command GID.

As shown in FIG. 15, in the case there is no second correction unit 542, the actual calories do not follow as to the calorie setting value, but as shown in FIG. 16, in the case there is a second correction unit 542, the actual calories follow the calorie setting value and change accordingly.

Third Modification

Figure 17:
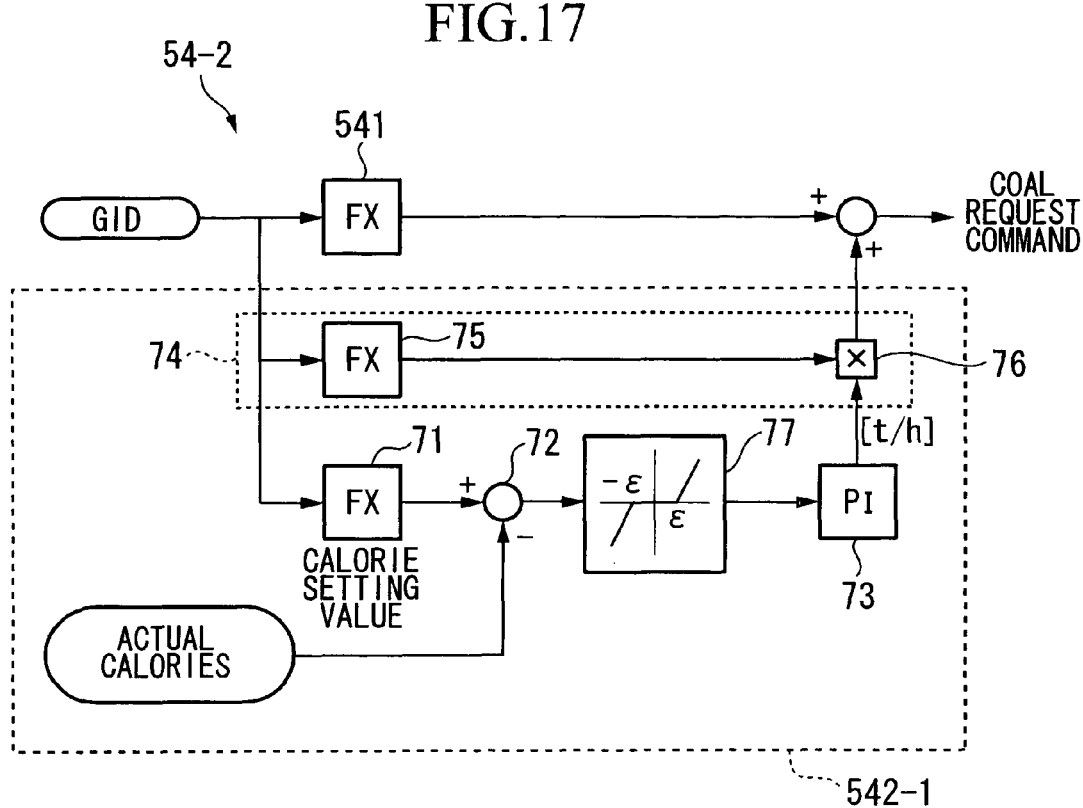
FIG. 17 is a block diagram illustrating a schematic configuration of a requested coal quantity setting unit relating to a third modification.

The requested coal quantity setting unit 54-1 having the second correction unit 542 may further have an adjusting unit 74 to adjust the requested coal corrected quantity from the proportional controller 73 according to power generated load, as shown in FIG. 17.

Figure 18:
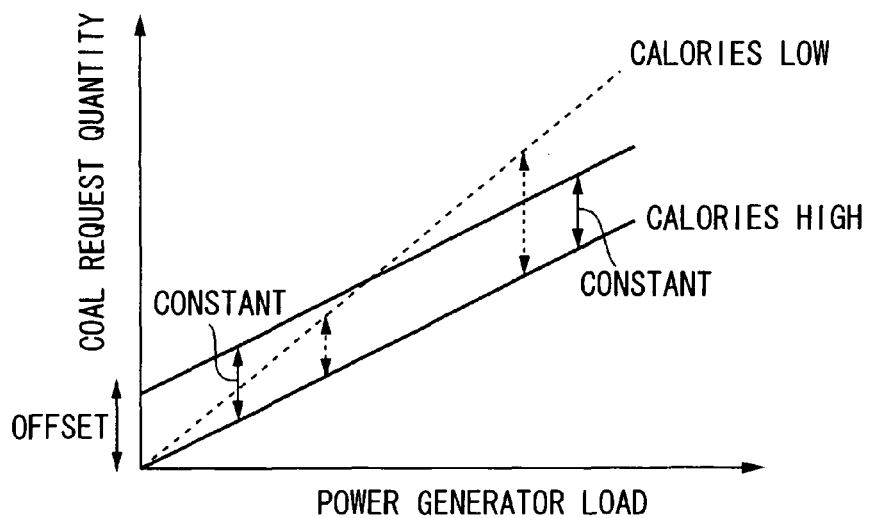
FIG. 18 is a diagram to describe the operation of an adjusting unit of the requested coal quantity setting unit relating to the third modification.

For example, as shown in FIG. 18, the supply quantity of the flammable gas as to the gasifying furnace overall command GID according to power generated load varies. At this time, if the calories of the flammable gas are the same, the higher the power generated load rises, the more flammable gas is required. If the calories of the flammable gas differs, the lower the calories the more flammable gas is needed, and the higher the power generated load rises, the difference between supply quantity in the case of low calories and the case of high calories becomes greater.

According to the requested coal quantity setting unit 54-1 shown in FIG. 14, the requested coal quantity is corrected according to the calorie variance, whereby favorable results can be found as to calorie variance. However, with the corrections performed here, with the graph shown in FIG. 18, a curved line with the same inclination is simply moved in parallel along the vertical axis (Y axis), i.e. only the offset value is changed, and the correction amount according to the power generating load is not being changed.

Thus, as shown in FIG. 17, the adjusting unit 74 to adjust the requested coal correcting amount according to the power generating load is further provided to the second correction unit, whereby a fine adjustment of the coal supply quantity, with consideration for both calories and power generating load, can be made. Specifically, the second correction unit 542-1 obtains the gasifying furnace command GID as the input information, and has an adjusting unit 74 which includes a function device 75 to obtain a correction multiplier according to the gasifying furnace overall command GID and power generation load, and a multiplier 76 to multiply the multiplier obtained with the function device 75 with the correction quantity output from the proportional control device 3. The output of the multiplier 76 is provided to the adder 74 as the final requested coal correction quantity of the second correction unit 542-1. According to the present modification, the correction quantity can be adjusted according to the power generating load, enabling finer controls.

Fourth Modification

Figure 19:
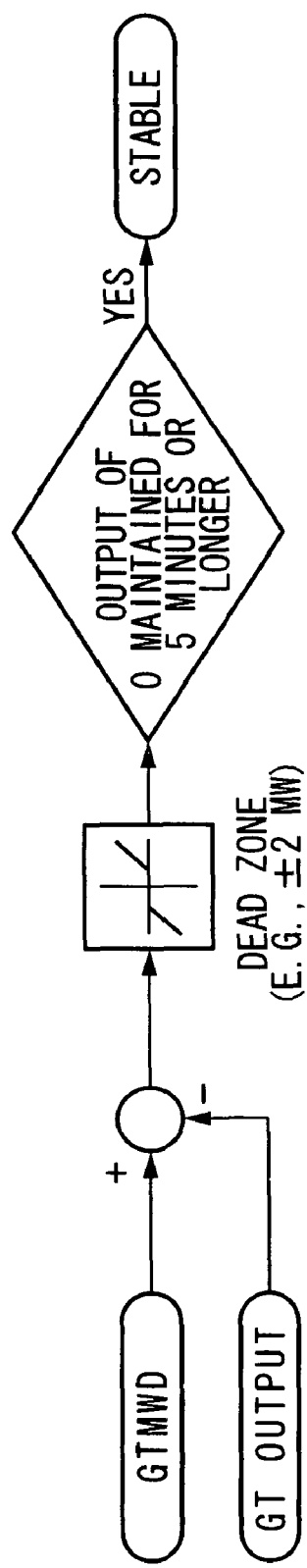
FIG. 19 is a diagram illustrating a configuration example of an evaluating unit.

With the above-described first, second, and third modifications, an evaluation unit is further provided to evaluate the stability of the power generating load, and in the case the evaluation unit determines that the load is stable, the first correction unit 563 and/or the second correction portions 542 and 542-1 may be operated. The evaluation unit computes, for example, the difference between the gas turbine output and the gas turbine output command, and in the case a state wherein this difference is within a predetermined value set beforehand continues for longer than a predetermined time period, the power generating load is determined to be stable. FIG. 19 is a diagram showing a configuration example of the evaluation unit.

Thus, by limiting the operation period of the first correction unit and second correction unit to the time when the power generating load is stable, the operation risks can be reduced.

Fifth Modification

Figure 20:
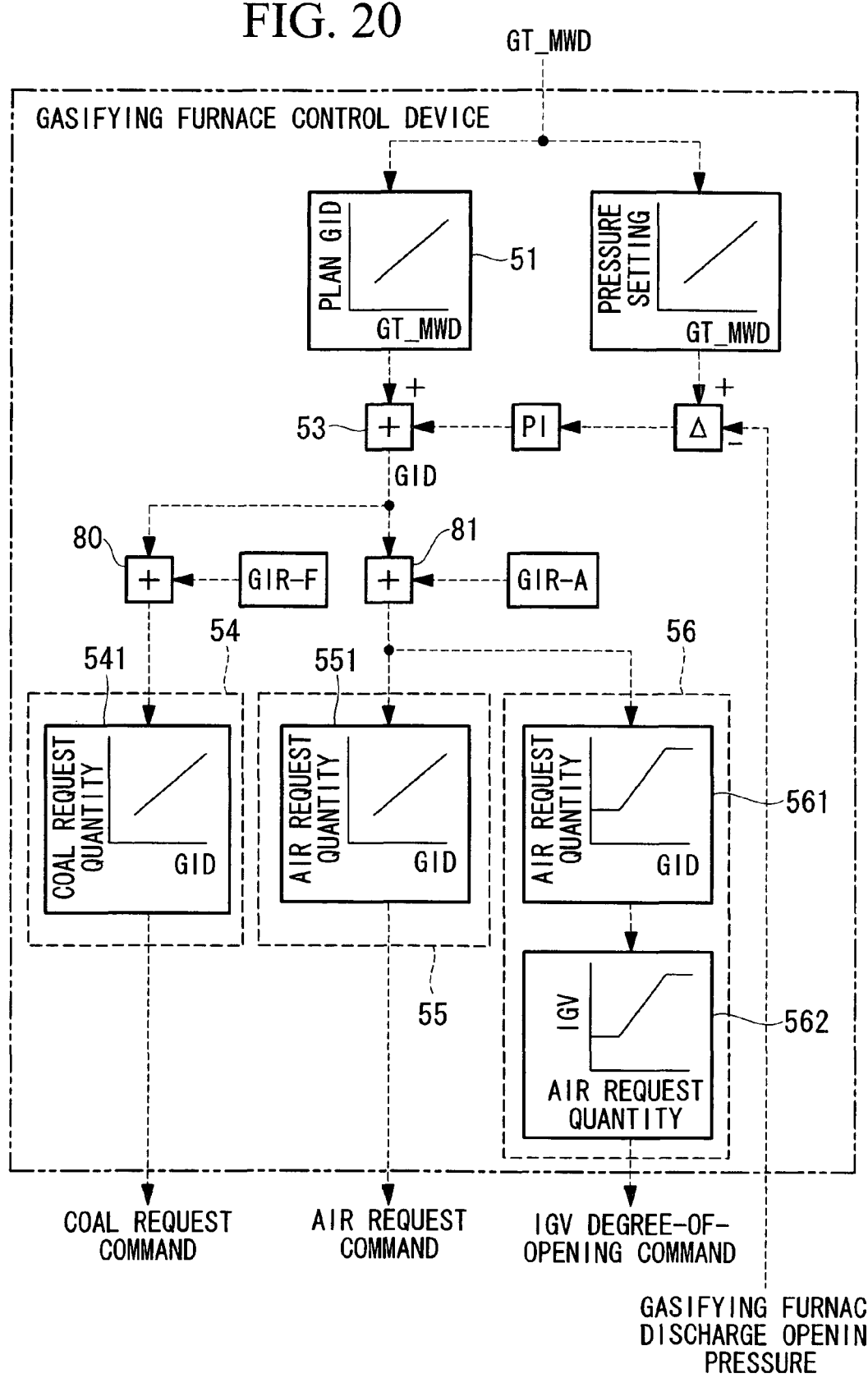
FIG. 20 is a block diagram illustrating a schematic configuration of a gasifying furnace control apparatus relating to a modification 5.

With the above-described embodiment, as shown in FIG. 20, the gasifying control device has an adder 80 to add a coal acceleration command GIR-F for advancing the operation state of the gasifying furnace 2 as to the gasifying furnace overall command GID, and an adder 81 to add the air acceleration command GIR-A for advancing the operation state of the gasifying furnace 2 as to the gasifying furnace overall command GID, whereby the output of the adder 80 may be output to the requested coal quantity setting unit 54 and the output of the adder 81 may be output to the requested air quantity setting unit 55 and the IGV degree of opening setting unit 56. The coal acceleration command GIR-F and the air acceleration command GIR-A are both control quantities which are set based on the gas turbine output command GT_MWD or the power generating output (power generation output command).

Thus, the acceleration commands GIR-F and GIR-A which are set based on the gas turbine output command GT_MWD or power generating output (power generation output command) are added to the gasifying furnace overall command GID to obtain the requested coal command, requested air command, and IGV degree-of-opening command, enabling operation of the gasifying furnace 2 during load fluctuation as a priority. Consequently, output variance influence due to delayed response from the steam turbine 17 can be reduced, enabling the output of the gas turbine to be stabilized early.

Sixth Modification

Figure 21:
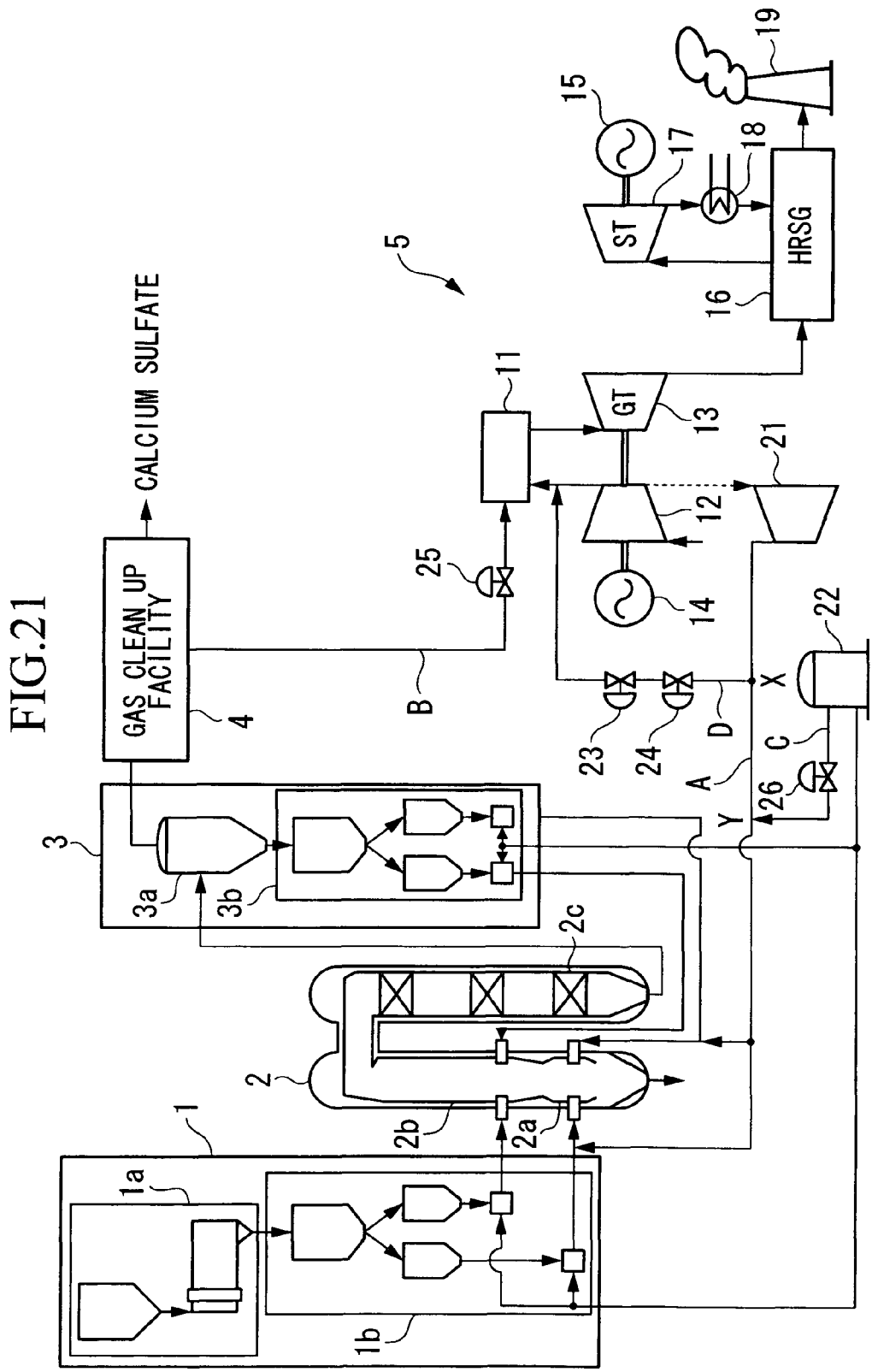
FIG. 21 is a block diagram illustrating a schematic configuration of the IGCC relating to a modification 6.

With the above described embodiments, the air in the atmosphere is transmitted to the axial flow compressor 21, but in addition, a portion of compressed air output from the compressor 12 may be supplied to the axial flow compressor 21, as shown in FIG. 21. In this case, an IGV valve 27 (unshown) is provided between the output of the compressor 12 and the input of the axial flow compressor 21.

With such a configuration, the compressed air which is compressed with the compressor 12 is taken into the axial flow compressor 21 as a gasifying agent. The axial flow compressor 21 further boosts the extracted compressed air, then inputs this into the gasifying supply path A. A portion of the gasifying agent input in the gasifying agent supply path A is input in the downstream side of the compressor 12 discharge opening, via the gasifying bypass path D.

In this case, the extraction quantity of the compressed air taken into the axial flow compressor 21 is adjusted with the degree-of-opening command of the IGV valve 27 (unshown) generated with the IGV degree of opening setting unit. The IGV degree of opening setting unit has a table or computation expression with consideration for the properties of the compressor 12, and the degree-of-opening command of the IGV valve 27 is generated employing the table or computation expression.

With the present modification also, a portion of the air extracted from the compressor 12 is returned and reused, whereby the pressure of the exhaust air from the compressor 12 can be suppressed, and output efficient of the gas turbine 13 can be improved.

As with the IGCC relating to the first embodiment described above, in the case of taking in air from the atmosphere as the gasifying agent, the operation of the axial flow compressor 21 is not influenced by the operation conditions of the compressor 12, so compared to the case of extracting compressed air from the compressor 12, there is the advantage that the control thereof is simple. There is the advantage that, in this case, the compressed air from the compressor 12 is all supplied to the combustor 11 and gas turbine 13, and can be used for burning in the combustor 11, and for cooling the various portions of the combustor 11 and gas turbine 13.

Seventh Modification

Figure 22:
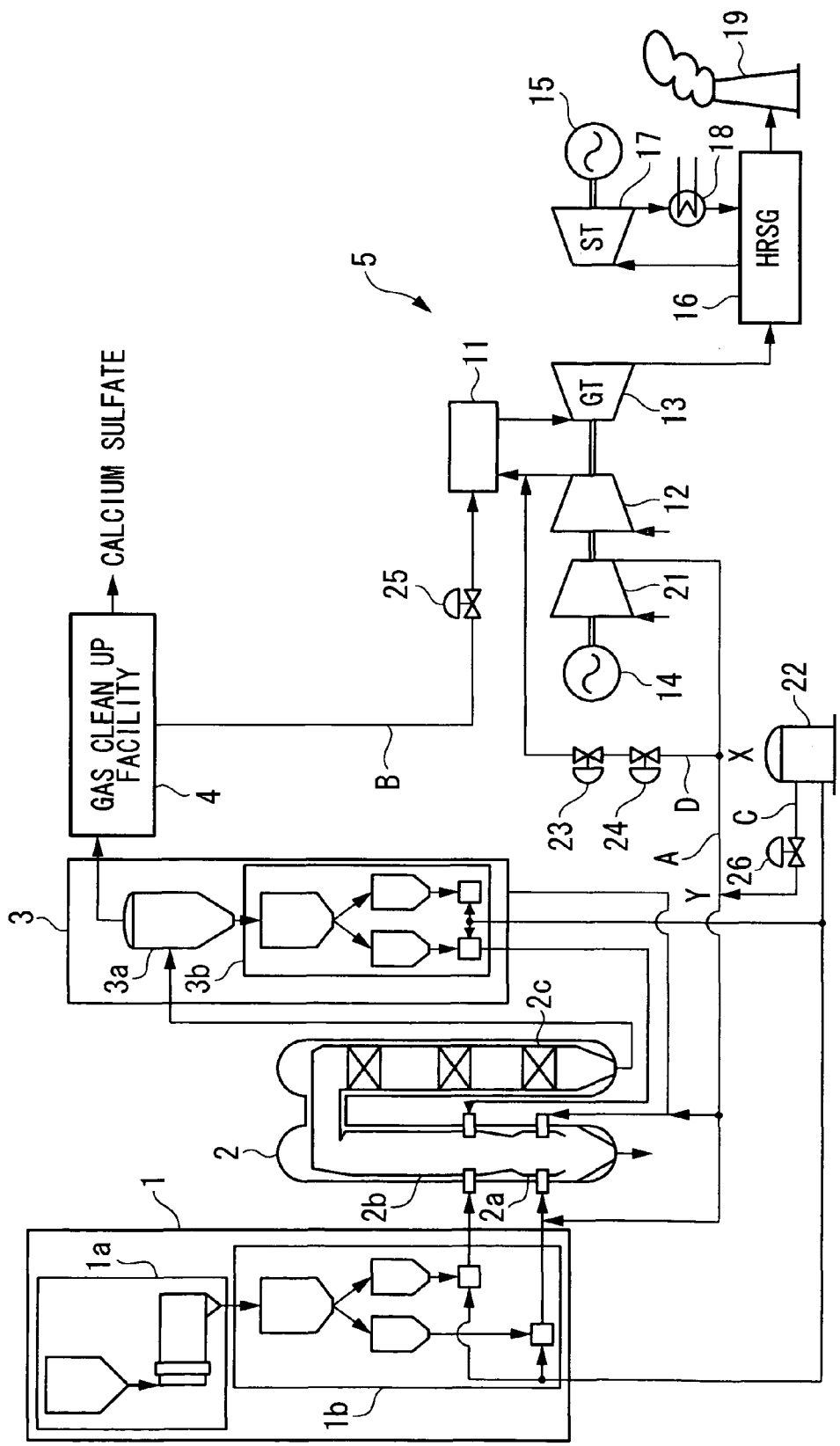
FIG. 22 is a block diagram illustrating a schematic configuration of the IGCC relating to a modification 7.

With the present modification, as shown in FIG. 22, the axial flow compressor 21 has the same shaft as the compressor 12, gas turbine 13, and power generator 14. Thus, since the axial flow compressor 21 has the same axis as the gas turbine 13, the rotational drive of the gas turbine 13 is transmitted with the shaft as a relay, thereby rotationally driving the axial flow compressor 21. An arrangement may be made wherein the steam turbine 17 and axial flow compressor 21 have the same axis, and transmitting the rotational drive of the steam turbine 17 with the shaft as a relay, the axial flow compressor 21 is rotationally driven. In the case that the gas turbine 13 and steam turbine 17 have the same axis, the rotational drive of the gas turbine 13 and steam turbine 17 is transmitted with the shaft as a relay, thereby rotationally driving the axial flow compressor 21.

With such a disposal, for example an electric motor to provide driving force to the axial flow compressor 21 does not need to be set, thereby preventing an increase in size of the IGCC plant.

Eighth Modification

With the above-described embodiments, the convergence destination on the downstream side of the gasifying agent bypass path D is the downstream side of the compressor 12 discharge opening, but an arrangement may be made to converge at a portion other than at the downstream side of the compressor 12 discharge opening. Regarding the convergence destination on the downstream side of the compressor 12 discharge opening, several examples will be given below, and each example will be described with reference to the diagrams. For each example described below, the branching point to the gasifying agent bypass path D is common with the branching point X provided on the gasifying agent supply path A described with the above embodiments. Accordingly, FIG. 23 through FIG. 28 show a configuration of the convergence point vicinity of the gasifying agent bypass path D for each example described below.

First Example of Gasifying Agent Bypass Path Convergence Point

Figure 23:
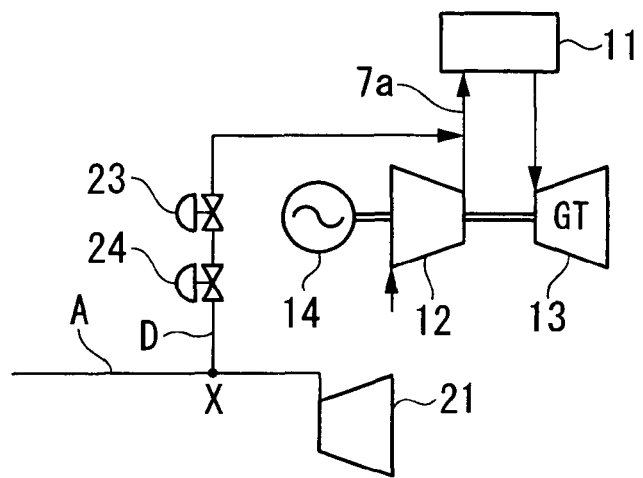
FIG. 23 is a block diagram illustrating a configuration of a first example of a convergence periphery of the gasifying agent bypass path with the IGCC according to the present invention.

A first example of the convergence point of the gasifying agent bypass path 22 will be described with reference to FIG. 23. With the present example, the convergence point of the gasifying agent bypass path D is provided at the opening of the combustor 11. That is to say, the convergence point of the gasifying agent bypass path D is provided at a compressed air supply path 7a which supplies the compressed air used for burning in the combustor 11 which is supplied from the compressor 12. By thus positioning the convergence point of the gasifying agent bypass path D, the gasifying agent from the axial flow compressor 21 flowing in the gasifying agent bypass path D can be used as a portion of air used for burning with the combustor 11.

Second Example of Gasifying Agent Bypass Path Convergence Point

Figure 24:
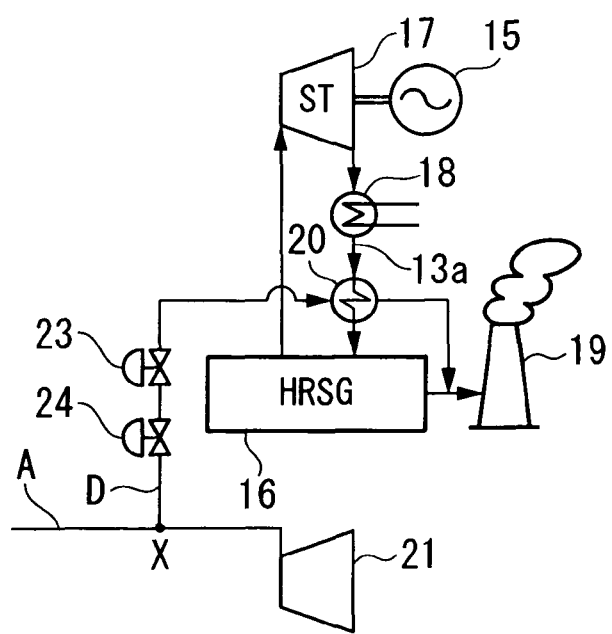
FIG. 24 is a block diagram illustrating a configuration of a second example of a convergence periphery of the gasifying agent bypass path with the IGCC according to the present invention.

A second example of the convergence point of the gasifying agent bypass path 22 will be described with reference to FIG. 24. With the present example, a heat converter 20 is provided on a water supply path 13a which supplies the HRSG 16 with water which is condensed with the condenser 18. An arrangement is made wherein the gasifying agent flowing in the gasifying agent bypass path D is supplied to the heat converter 20, and after heat recovery is performed by the water supplied from the condenser 18 to the HRSG 16, this is exhausted through the smokestack 19 or used as cooling air for the gas turbine (unshown).

Thus, a portion of the gasifying agent heated to a high temperature by boosting with the axial flow compressor 21 is supplied to the heat converter 20 via the gasifying agent bypass path D, and heat is provided to the water from the condenser 18 which is converted to steam with the HRSG 16. Accordingly, the exhaust heat of the gasifying agent heated to a high temperature by boosting with the axial flow compressor 21 is used, and is converted to a portion of driving force to the steam turbine 17, whereby the heat efficiency of the overall IGCC can be increased.

Third Example of Gasifying Agent Bypass Path Convergence Point

Figure 25:
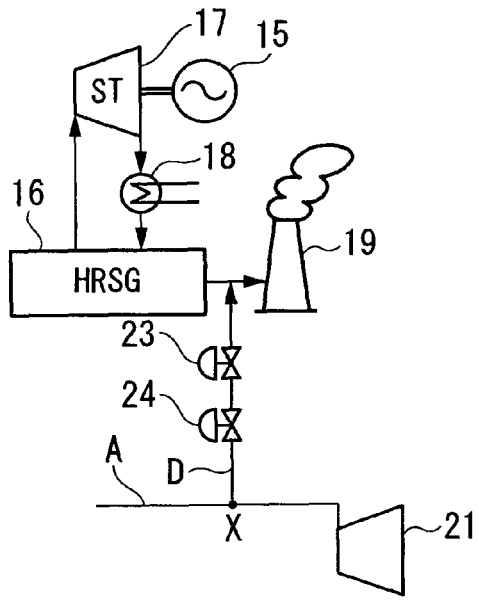
FIG. 25 is a block diagram illustrating a configuration of a third example of a convergence periphery of the gasifying agent bypass path with the IGCC according to the present invention.

A third example of the convergence point of the gasifying agent bypass path D will be described with reference to FIG. 25. With the present example, the convergence point of the gasifying agent bypass path D is provided at the discharge opening of the HRSG 16. That is to say, the gasifying agent passing through the gasifying agent bypass path D is converged with the exhaust gas subjected to heat recovery in the HRSG 16, and is exhausted through the smokestack 19. With the present example, the air which escaped to the gasifying agent bypass path D for adjusting the flow quantity and pressure of the gasifying agent supplied to the gasifying furnace 2 from the gasifying agent supply path A is discharged through the smokestack 19 as exhaust gas.

Fourth Example of Gasifying Agent Bypass Path Convergence Point

Figure 26:
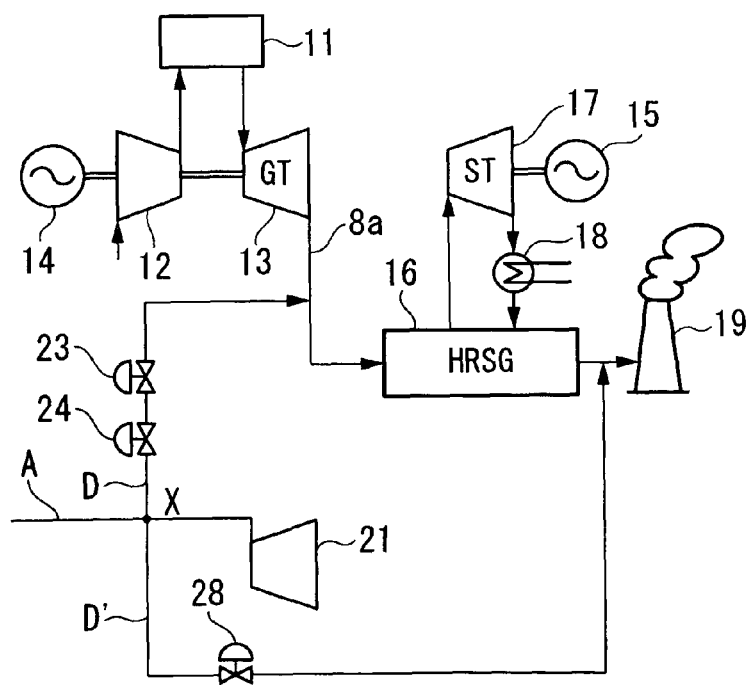
FIG. 26 is a block diagram illustrating a configuration of a fourth example of a convergence periphery of the gasifying agent bypass path with the IGCC according to the present invention.

A fourth example of the convergence point of the gasifying agent bypass path D will be described with reference to FIG. 26. With the present example, the convergence point of the gasifying agent bypass path D is provided at the exhaust gas supply path 8a from the gas turbine 13 to the HRSG 16. That is to say, the gasifying agent heated to a high temperature by boosting with the axial compressor 21 is supplied to the HRSG 16 along with the exhaust gas from the gas turbine 13, whereby the exhaust heat is used. Accordingly, with the HRSG, the fluid flow quantity to supply heat for performing steam generation to supply to the steam turbine 17 can be increased, enabling the heat efficiency of the entire IGCC to increase.

A gasifying agent bypass path D' is provided in parallel to the gasifying agent bypass path D. This gasifying agent bypass path D' branches from the branching point X of the gasifying supply path A, similar to the gasifying agent bypass path D in FIG. 24, and converges with the discharge opening of the HRSG 16. An escaping pressure adjusting valve 23 and blocking valve 24 are disposed in the gasifying agent bypass path D which converge with the exhaust gas supply path 8a, and a blocking valve 28 is disposed in the gasifying agent bypass path D' to converge at the discharge opening of the HRSG 16. That is to say, normally, by closing the blocking valve 28, the state thereof is so that the gasifying agent does not flow into the gasifying agent bypass path D', and the flow quantity pressure of the gasifying agent supplied from the gasifying agent supply path A to the gasifying furnace 2 is adjusted by the degree of opening of the escaping pressure adjusting valve 23 in the gasifying agent bypass path D.

On the other hand, if the gasifying agent bypass path D becomes unusable as when a problem occurs in the gasifying agent bypass path D, first, by closing the blocking valve 24, a state is created wherein air does not flow into the gasifying agent bypass path D. By opening the blocking valve 28, the gasifying agent can flow into the gasifying agent bypass path D', and is exhausted to the ambient atmosphere as exhaust gas with the smokestack 19 through the gasifying bypass path D'.

Fifth Example of Gasifying Agent Bypass Path Convergence Point

A fifth example of the convergence point of the gasifying agent bypass path D will be described with reference to FIG. 27. First, in FIG. 27, the steam turbine 17 is made up of a high pressure steam turbine 17H, medium pressure steam turbine 17I, and low pressure steam turbine 17L. The steam to turn the high pressure steam turbine 17H, medium pressure steam turbine 17I, and low pressure steam turbine 17L is supplied from the HRSG 16. At this time, the steam generated from water which is supplied from the condenser 18 in the HRSG 16 is supplied to the low pressure steam turbine 17L, and steam with a higher pressure steam than supplied to the low pressure steam turbine 17L is supplied to the medium pressure steam turbine 17I. Further, steam with an even higher pressure than the steam supplied to the medium steam turbine 17I is supplied to the high pressure steam turbine 17H.

Thus, when the steam to be supplied to each of the high pressure steam turbine 17H, medium pressure steam turbine 17I, and low pressure steam turbine 17L is generated at the HRSG 16, the steam exhausted after turning the high pressure steam turbine 17H is boosted by heating with the HRSG 16, and is supplied to the medium steam turbine 17I. The steam exhausted after turning the medium pressure steam turbine 17I is boosted by heating with the HRSG 16, and is supplied to the low steam turbine 17L. The steam to be exhausted after turning the low pressure steam turbine 17L is supplied to the condenser 18 and condensed.

Figure 27:
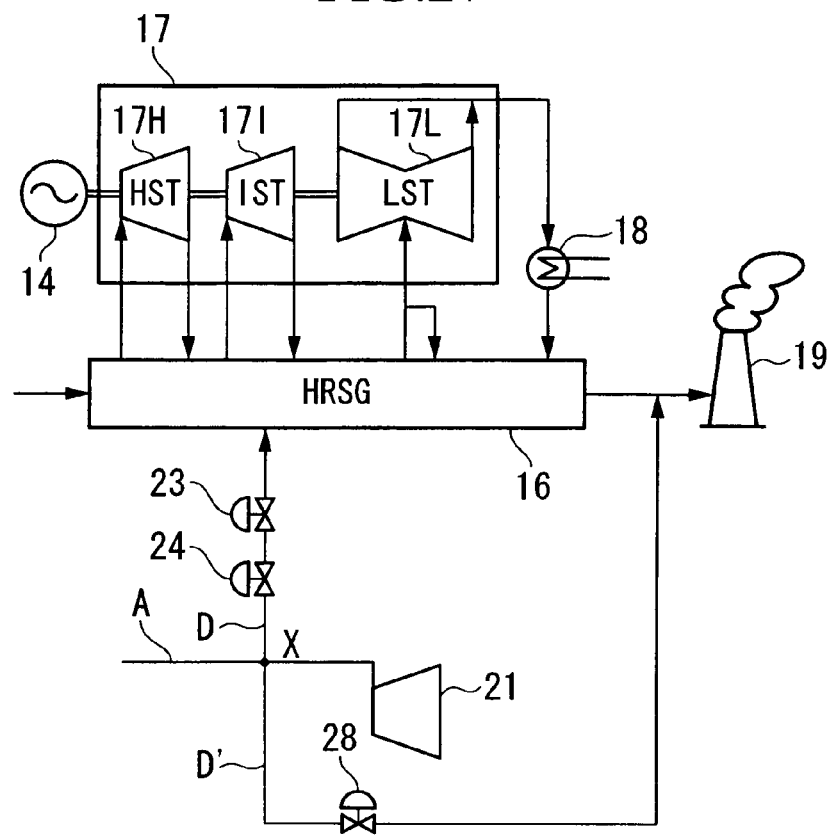
FIG. 27 is a block diagram illustrating a configuration of a fifth example of a convergence periphery of the gasifying agent bypass path with the IGCC according to the present invention.

When there are the high pressure steam turbine 17H, medium pressure steam turbine 17I, and low pressure steam turbine 17L, as shown in FIG. 27, the convergence point of the gasifying bypass path D is provided on the middle portion of the HRSG 16. Accordingly, for example, this can be converged with exhaust gas used for exhaust heat for steam generation to supply to the high pressure steam turbine 17H. Thus, a portion of the gasifying agent from the axial flow compressor 21 can be converged with the exhaust gas wherein the exhaust heat has been used and the temperature thereof dropped.

That is to say, as described with the fourth example, when the convergence point is configured for the gasifying agent bypass path D in the opening to the HRSG 16, the temperature of the gasifying agent from the axial flow compressor 21 (roughly 450 to 500 degrees° C.) is lower than the temperature of exhaust gas from the gas turbine 13 (roughly 600 degrees° C.), and accordingly the temperature efficiency drops. However, with the present example, by converging with the exhaust gas wherein the exhaust heat has already been used and temperature has dropped at the HRSG 16, the flow quantity of the fluid used for discarding heat with the HRSG 16 can be increased without lowering heat efficiency.

Similar to the above-described fourth example (see FIG. 26), the gasifying agent bypass path D' which is branched from the branching point X of the gasifying agent supply path A is disposed, so as to be parallel with the gasifying agent bypass path D. The gasifying agent bypass path D' has a blocking valve 28, and also converges to the discharge opening of the HRSG 16. Thus, when the gasifying agent bypass path D cannot be used, such as when there is a problem with the gasification agent bypass path D, the blocking valve 28 is opened, whereby the gasifying agent can be exhausted to the outside air through the smokestack 19 as exhaust gas, via the gasifying agent bypass path D'.

With the present example, a configuration of the steam turbine 17 made up of a high pressure steam turbine 17H, medium pressure steam turbine 17I, and low pressure steam turbine 17L has been made clear, but with each embodiment and each example described above, the steam turbine 17 may be made up of a high pressure steam turbine 17H, medium pressure steam turbine 17I, and low pressure steam turbine 17L.

Figure 28:
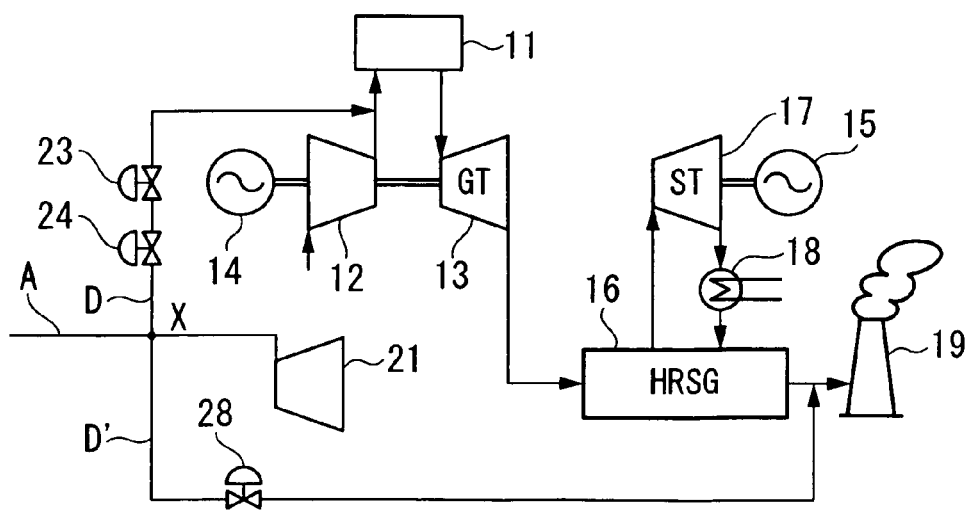
FIG. 28 is a block diagram illustrating a configuration of another example of a convergence periphery of the gasifying agent bypass path with the IGCC according to the present invention.

Further, as shown in FIG. 28, an arrangement may be made wherein the gasifying agent bypass path D' shown in the above-described fourth example and fifth example may be combined with the above-described various types of gasifying agent supply path D. For example, as shown in FIG. 28, the gasifying agent bypass paths D and D' are branched at the branching point X of the gasifying agent supply path A so as to be parallel with one another, the gasifying agent bypass path D is converted at the discharge opening of the axial flow compressor 21, and also the gasifying agent bypass path D' is converged at the discharge opening of the HRSG 16. Thus, various types of convergence forms can be conceived for the gasifying agent bypass path D' and D', as described above, and designs can be made aiming for various advantages with optional combinations of the forms thereof.

Various embodiments and various modifications of the IGCC, the operation control device, and method thereof relating to the present invention have been described, but the variations herein are not limited to those illustrated, and it goes without saying that arbitrary combinations can be made.

The embodiments of the present invention have been described with reference to the diagrams, but specific configurations are not limited to these embodiments, and various design changes and so forth without departing from the essence of the present invention are also encompassed.

What is claimed is:

1. An integrated gasification combined cycle power generation plant comprising:
   gasifying furnace to generate a flammable gas by causing a gasifying agent which is a gas and solid fuel to react;
   a compressor to output compressed air which compresses ambient atmosphere;
   a combustor to combust the flammable gas generated in the gasifying furnace with compressed air from the compressor;
   a gas turbine to rotationally drive supplied by combusted gas with the combustion operation of the combustor;
   a booster to boost the gasifying agent supplied to the gasifying furnace;
   a gasifying agent supply path to supply the gasifying agent boosted by the booster to the gasifying furnace without being mediated by any control valves;
   a gasifying agent bypass path which is branched from a gasifying agent supply path and which converges with one of a compressor discharge opening and the combustor input opening; and
   a first control valve to adjust flow quantity or pressure of the gasifying agent flowing through the gasifying agent bypass path, by adjusting the degree of opening thereof.

2. The integrated gasification combined cycle power generation plant according to claim 1, further comprising:
   a flammable gas supply path to supply the flammable gas generated at the gasifying furnace to the combustor; and
   a third control valve to adjust flow quantity and pressure of the flammable gas flowing through the flammable gas supply path, by adjusting the degree of opening thereof.

3. The integrated gasification combined cycle power generation plant according to claim 1, wherein the booster extracts a portion of compressed air from the compressor.

4. The integrated gasification combined cycle power generation plant according to claim 1, wherein the booster has the same axis as the gas turbine.

5. An operating control apparatus applicable to an integrated gasification combined cycle power generation plant;
   the integrated gasification combined cycle power generation plant including
      a gasifying furnace to generate a flammable gas by causing a gasifying agent which is a gas and solid fuel to react;

a combustor to combust the flammable gas generated in the gasifying furnace with compressed air from a compressor;

a gas turbine to rotationally drive supplied by combusted gas with the combustion operation of the combustor;

a booster to boost the gasifying agent supplied to the gasifying furnace;

a gasifying agent supply path to supply the gasifying agent boosted by the booster to the gasifying furnace without being mediated by any control valves;

a gasifying agent bypass path which is branched from a gasifying agent supply path and which converges with one of a compressor discharge opening and the combustor input opening;

a first control valve provided on the gasifying agent bypass path; and a second control valve to control the flow quantity of gas supplied to the booster; and the operation control apparatus further including a first setting unit to set the gasifying agent requested amount to the gasifying furnace, based on the gas turbine requested output;

a first control unit to control the degree of opening of the first control valve so that the gasifying agent quantity supplied to the gasifying furnace is equal to the gasifying agent request quantity set by the first setting unit;

a second setting unit to set the degree-of-opening command of the second control valve so that the gasifying agent of a greater quantity than the gasifying agent request quantity is supplied to the gasifying bypass path; and a second control unit to control the second control valve based on the degree-of-opening command set by the second setting unit.

6. The operating control apparatus according to claim 5, in a case wherein the integrated gasification combined cycle power generation plant further has a flammable gas supply path to supply the flammable gas generated in the gasifying furnace to the combustor, and a third control valve provided on the flammable gas supply path, further comprising:

a third setting unit to set the flow quantity of the flammable gas supplied to the combustor, based on the requested output of the gas turbine and the ambient environment of the gas turbine; and a third control unit to control the degree of opening of the third control valve so that the flow quantity of the flammable gas supplied to the combustor is equal to the flow quantity set by the third setting unit which is set by the third setting unit.

7. The operating control apparatus according to claim 5, wherein the first setting unit obtains the flammable gas request quantity to supply to the combustor based on the requested output of the gas turbine and the ambient environment of the gas turbine, and sets the gasifying agent request quantity to the gasifying furnace based on the flammable gas request quantity.

8. The operating control apparatus according to claim 5, further comprising:

a first correcting unit to correct the degree-of-opening command of the second control valve in the direction to increase the volume of air supplied to the booster, based on the boosting properties.

9. The operating control apparatus according to claim 8, further comprising:

an evaluating unit to evaluate the stability of load;

wherein, in the case that determination is made by the evaluating unit that the load is stable, the first correcting unit is operated.

10. The operating control apparatus according to claim 5, in a case wherein the integrated gasification combined cycle power generation plant has a solid fuel supply path to supply the solid fuel to the gasifying furnace, and a fourth control valve provided in the solid fuel supply path, further comprising:

a fourth setting unit to set a solid fuel request quantity to the gasifying furnace, based on the requested output of the gas turbine; and a fourth control unit to control the degree of opening of the fourth control valve, so that the solid fuel supplied to the gas furnace is equal to the solid fuel requested amount set by the fourth setting unit.

11. The operating control apparatus according to claim 10, further comprising:

a second correcting unit to correct the solid fuel request quantity based on the calories of the solid fuel supplied to the gasifying furnace.

12. The operating control apparatus according to claim 11, wherein the second correcting unit corrects the solid fuel requested amount based on the calories of the solid fuel and power generating load.

13. The operating control apparatus according to claim 11, further comprising:

an evaluating unit to evaluate the stability of load;

wherein, in the case that determination is made by the evaluating unit that the load is stable, the second correcting unit is operated.

14. An operating control method applicable to an integrated gasification combined cycle power generation plant;

the integrated gasification combined cycle power generation plant including a gasifying furnace to generate a flammable gas by causing a gasifying agent which is a gas and solid fuel to react;

a combustor to combust the flammable gas generated in the gasifying furnace with compressed air from a compressor;

a gas turbine to rotationally drive supplied by combusted gas with the combustion operation of the combustor;

a booster to boost the gasifying agent supplied to the gasifying furnace;

a gasifying agent supply path to supply the gasifying agent boosted by the booster to the gasifying furnace without being mediated by any control valves;

gasifying agent bypass path which is branched from a gasifying agent supply path and which converges with one of a compressor discharge opening and the combustor input opening;

a first control valve provided on the gasifying agent bypass path; and a second control valve to control the flow quantity of gas supplied to the booster; and the operation control method includes a step of setting the gasifying agent requested amount to the gasifying furnace, based on the gas turbine requested output;

a step of controlling the degree of opening of the first control valve so that the gasifying agent quantity supplied to the gasifying furnace is equal to the gasifying agent request quantity;

a step of setting the degree-of-opening command of the second control valve so that the gasifying agent of a greater quantity than the gasifying agent request quantity is supplied to the gasifying bypass path; and a step of controlling the second control valve based on the degree-of-opening command.

15. An integrated gasification combined cycle power generation plant comprising:

a gasifying furnace to generate a flammable gas by causing a gasifying agent which is a gas and solid fuel to react;

a compressor to output compressed air which compresses ambient atmosphere;

a combustor to combust the flammable gas generated in the gasifying furnace with compressed air from a compressor;

a gas turbine to rotationally drive supplied by combusted gas with the combustion operation of the combustor;

a booster to boost the gasifying agent supplied to the gasifying furnace;

a gasifying agent supply path to supply the gasifying agent boosted by the booster to the gasifying furnace;

a gasifying agent bypass path which is branched from the gasifying agent supply path; and a first control valve to adjust flow quantity or pressure of the gasifying agent flowing through the gasifying agent supply path, by adjusting the degree of opening thereof;

wherein the gasifying agent bypass path converges with the combustor input opening.

* * * * *